United States Patent
Cho et al.

(10) Patent No.: US 9,699,698 B2
(45) Date of Patent: Jul. 4, 2017

(54) NETWORK CONTROLLER WITHIN CORE NETWORK AND METHOD FOR CONNECTION WITH TERMINAL BY NETWORK CONTROLLER

(71) Applicant: LG ELECTRONICS INC., Seoul (KR)

(72) Inventors: Heejeong Cho, Seoul (KR); Hyunsoo Ko, Seoul (KR); Hyeyoung Choi, Seoul (KR); Ilmu Byun, Seoul (KR); Kungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/915,765

(22) PCT Filed: Aug. 22, 2014

(86) PCT No.: PCT/KR2014/007842
§ 371 (c)(1),
(2) Date: Mar. 1, 2016

(87) PCT Pub. No.: WO2015/034193
PCT Pub. Date: Mar. 12, 2015

(65) Prior Publication Data
US 2016/0198379 A1    Jul. 7, 2016

Related U.S. Application Data

(60) Provisional application No. 61/873,799, filed on Sep. 4, 2013, provisional application No. 61/890,325, filed
(Continued)

(51) Int. Cl.
*H04W 36/00* (2009.01)
*H04W 36/14* (2009.01)
(Continued)

(52) U.S. Cl.
CPC .......... *H04W 36/14* (2013.01); *H04W 48/18* (2013.01); *H04W 76/026* (2013.01);
(Continued)

(58) Field of Classification Search
CPC ... H04W 36/14; H04W 48/18; H04W 76/026; H04W 84/042; H04W 84/12; H04W 88/06
(Continued)

(56) References Cited

U.S. PATENT DOCUMENTS 8,073,428 B2 * 12/2011 Khetawat ............. H04W 16/16
455/411
8,948,137 B2 *  2/2015 Sachs ........................... 370/332
(Continued)

FOREIGN PATENT DOCUMENTS

KR    1020080106142    12/2008
WO       2011099769     8/2011
(Continued)

OTHER PUBLICATIONS

PCT International Application No. PCT/KR2014/007842, Written Opinion of the International Searching Authority dated Dec. 1, 2014, 2 pages.

*Primary Examiner* — Shahriar Behnamian
(74) *Attorney, Agent, or Firm* — Lee Hong Degerman Kang Waimey

(57) ABSTRACT

The present invention relates to a network controller within a core network in a radio communication system, and a method for forming an interface with a terminal. In the network controller, if a terminal requests a predetermined radio node for a connection between the terminal and a core network through a first radio interface by a first radio protocol, a connection to the terminal by a NAS protocol is established and configuration information for the connection
(Continued)

to the terminal is stored, and if the terminal requests the radio node for a connection between the terminal and the core network through a second radio interface by a second radio protocol, a connection to the terminal by the NAS protocol may be established using the configuration information.

9 Claims, 24 Drawing Sheets

Related U.S. Application Data on Oct. 14, 2013, provisional application No. 61/976,502, filed on Apr. 8, 2014, provisional application No. 61/981,199, filed on Apr. 18, 2014.

(51) Int. Cl.
 *H04W 76/02* (2009.01)
 *H04W 48/18* (2009.01)
 *H04W 88/06* (2009.01)
 *H04W 84/04* (2009.01)
 *H04W 84/12* (2009.01)

(52) U.S. Cl.
 CPC .......... *H04W 84/042* (2013.01); *H04W 84/12* (2013.01); *H04W 88/06* (2013.01)

(58) Field of Classification Search
 USPC ................................................. 455/436–444
 See application file for complete search history.

(56) References Cited

U.S. PATENT DOCUMENTS

| 2006/0003807 | A1* | 1/2006 | Inoue ................... H04W 88/10 455/561 |
| 2009/0131053 | A1* | 5/2009 | Sachs ................ H04W 36/0016 455/436 |
| 2010/0291933 | A1* | 11/2010 | Choi ....................... H04L 12/66 455/436 |
| 2013/0016696 | A1 | 1/2013 | Adjakple et al. |
| 2015/0063091 | A1* | 3/2015 | Vesterinen .......... H04W 76/028 370/216 |

FOREIGN PATENT DOCUMENTS

| WO | 2012134244 | 10/2012 |
| WO | 2012138099 | 10/2012 |

\* cited by examiner

NETWORK CONTROLLER WITHIN CORE NETWORK AND METHOD FOR CONNECTION WITH TERMINAL BY NETWORK CONTROLLER

CROSS-REFERENCE TO RELATED APPLICATIONS

This application is the National Stage filing under 35 U.S.C. 371 of International Application No. PCT/KR2014/007842, filed on Aug. 22, 2014, which claims the benefit of U.S. Provisional Application Nos. 61/873,799, filed on Sep. 4, 2013, 61/890,325, filed on Oct. 14, 2013, 61/976,502, filed on Apr. 8, 2014 and 61/981,199, filed on Apr. 18, 2014, the contents of which are all hereby incorporated by reference herein in their entirety.

BACKGROUND OF THE INVENTION

Field of the Invention

The present invention relates to wireless communications, and more particularly, to a user equipment in a communication environment that supports a plurality of wireless networks and a network controller within a core network.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

FIG. 1 is a schematic diagram illustrating a structure of evolved mobile communication network.

As shown in FIG. 1, an evolved UMTS terrestrial radio access network (E-UTRAN) is connected to an evolved packet core (EPC).

The E-UTRAN includes base stations (or eNodeBs) 20 that provides a control plane and a user plane to a user equipment (UE). The base stations (or eNodeBs) 20 may be interconnected through an X2 interface.

The radio interface protocol layers between the UE and the base station (or eNodeB) 20 may be divided by L1 (a first layer), L2 (a second layer) and L3 (a third layer) based on lower three layers of open system interconnection (OSI) standard model that is widely known in communication systems. Among these layers, a physical layer included in the first layer provides an information transfer service using a physical channel, and a radio resource control (RRC) layer located at the third layer performs a role of controlling radio resources between the UE and the base station. For this, the RRC layer exchanges a RRC message between the UE and the base station.

Meanwhile, the EPC may include various elements. FIG. 1 shows a mobility management entity (MME) 51, a serving gateway (S-GW) 52, a packet data network gateway (PDN GW) 53 and a home subscriber server (HSS) 54 among the various elements.

The base station (or eNodeB) 20 is connected to the mobility management entity (MME) 51 of the EPC through an S1 interface, and is connected to the serving gateway (S-GW) 52 through an S1-U.

The S-GW 52 is an element that operates at a boundary point between a radio access network (RAN) and a core network and has a function of maintaining a data path between an eNodeB 20 and the PDN GW 53. Furthermore, if a user equipment (UE) moves in a region in which service is provided by the eNodeB 20, the S-GW 52 plays a role of a local mobility anchor point. That is, for mobility within an E-UTRAN (universal mobile telecommunications system (Evolved-UMTS) terrestrial radio access network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or global system for mobile communication (GSM) (GERAN)/enhanced data rates for global evolution (EDGE) radio access network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an interworking wireless local area network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, recently, the high speed data traffic has been rapidly increased. In order to meet such traffic increase, technologies have been introduced for offloading the traffic of UE to WLAN (Wi-Fi) or a small cell.

FIG. 2 is a schematic diagram illustrating a network structure to which a small cell or a WLAN AP is added.

Referring to FIG. 2, within the coverage of a base station 31 for the small cell, a plurality of WLAN AP may be arranged. That is, several radio access technologies (RATs) are existed around a UE. Accordingly, the UE may distribute data traffic into the several RATs. The base station 31 for small cell may be arranged within the coverage of a macro base station such as the existing eNodeB.

As known from by reference to FIG. 2, the P-GW 53 and the HSS 54 are connected to an access authentication authorization (AAA) server 56. The P-GW 53 and the AAA server 56 may be connected to an evolved packet data gateway (ePDG) 57. The ePDG 57 plays a role of a security node for not being trusted non-3GPP network (e.g., WLAN or Wi-Fi, etc.). The ePDG 57 may be connected to a WLAN access gateway (WAG) 58. The WAG 58 may be in charge of a role of P-GW in Wi-Fi system.

As such, as the existing mobile communication network is associated with a hetero network, an interface for establishing connection or session may be required between a UE and a core network using the hetero network.

SUMMARY OF THE INVENTION

An object of the present invention is to provide a method for connecting a UE and a core network and a method for establishing a session, in case that the UEs are available to communicate with each other through a radio interface according to radio protocols different from each other.

Another object of the present invention is to provide a method for switching state of connection and session between a UE and a core network depending on a state transit of the UE and a wireless node.

A method for connecting a user equipment (UE) by a network controller within a core network according to an embodiment of the present invention may include establishing a connection with the UE through a NAS protocol and storing configuration information for the connection with the UE, if the UE requests a connection with the core network to a wireless node through a first radio interface by a first radio protocol, and establishing the connection with the UE through the NAS protocol using the configuration information, if the UE requests a connection with the core network to the wireless node through a second radio interface by a second radio protocol.

ADVANTAGEOUS EFFECTS

According to the present invention, in case that UEs are available to communicate through a radio interface according to radio protocols different from each other, a method for connecting a UE and a core network and a method for establishing a session are provided.

DESCRIPTION OF EXEMPLARY EMBODIMENTS

A wireless device may be fixed and may have mobility, and may be referred to as other terms such as user equipment (UE), MS (mobile station), UT (user terminal), SS (subscriber station), and MT (mobile terminal). In general, a base station (BS) refers to a fixed station communicating with the wireless device, and may be referred to as other terms such as eNB (evolved-NodeB), BTS (base transceiver system), and access point (AP).

The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks. Hereinafter, the LTE includes LTE and/or LTE-A.

The present specification is described targeted to a communication network, and tasks performed in the communication network may be performed during controlling network by a system (e.g., a BS) that controls the corresponding communication network or performed by a UE which is linked to the corresponding network.

Figure 1:
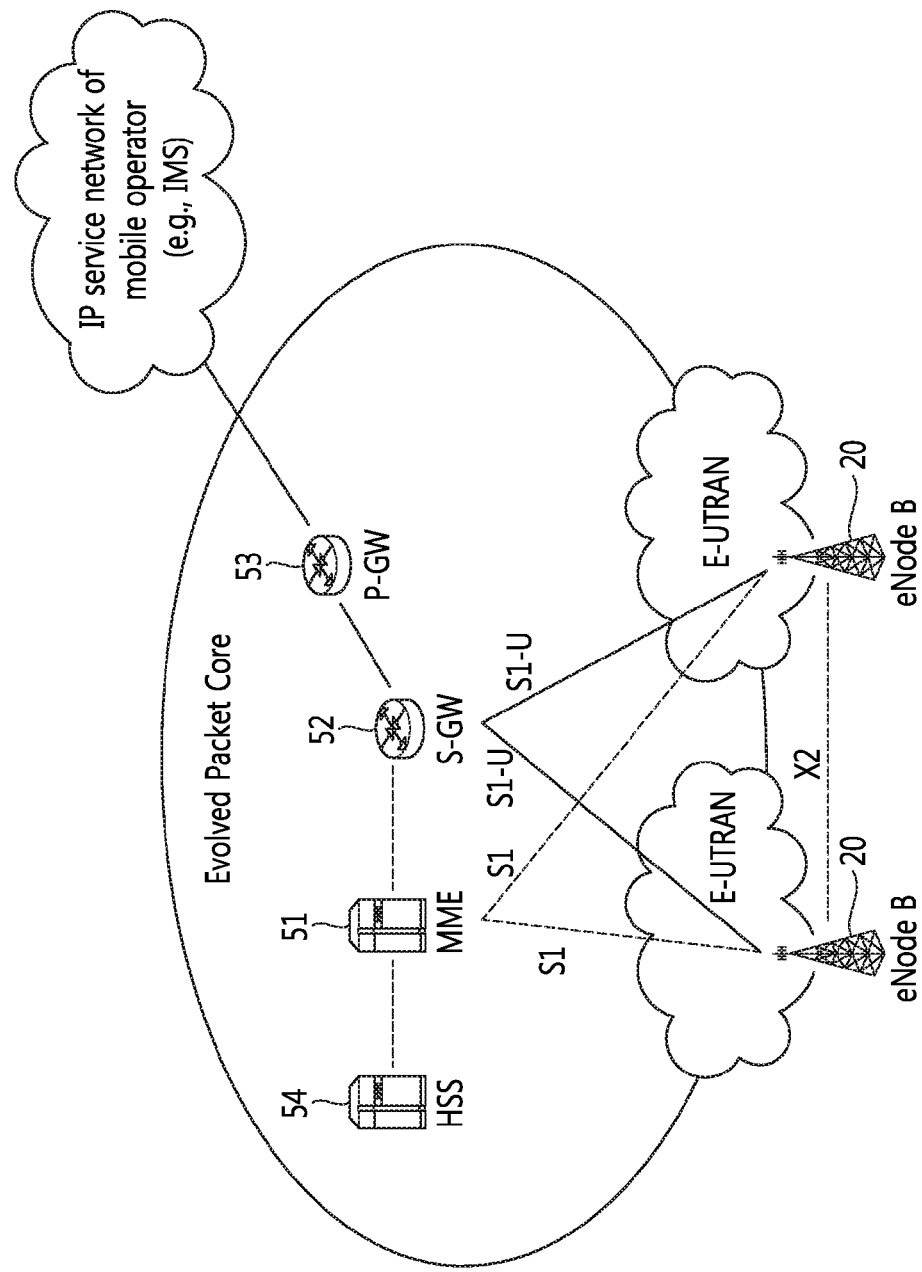
FIG. 1 is a schematic diagram illustrating a structure of evolved mobile communication network.
Figure 2:
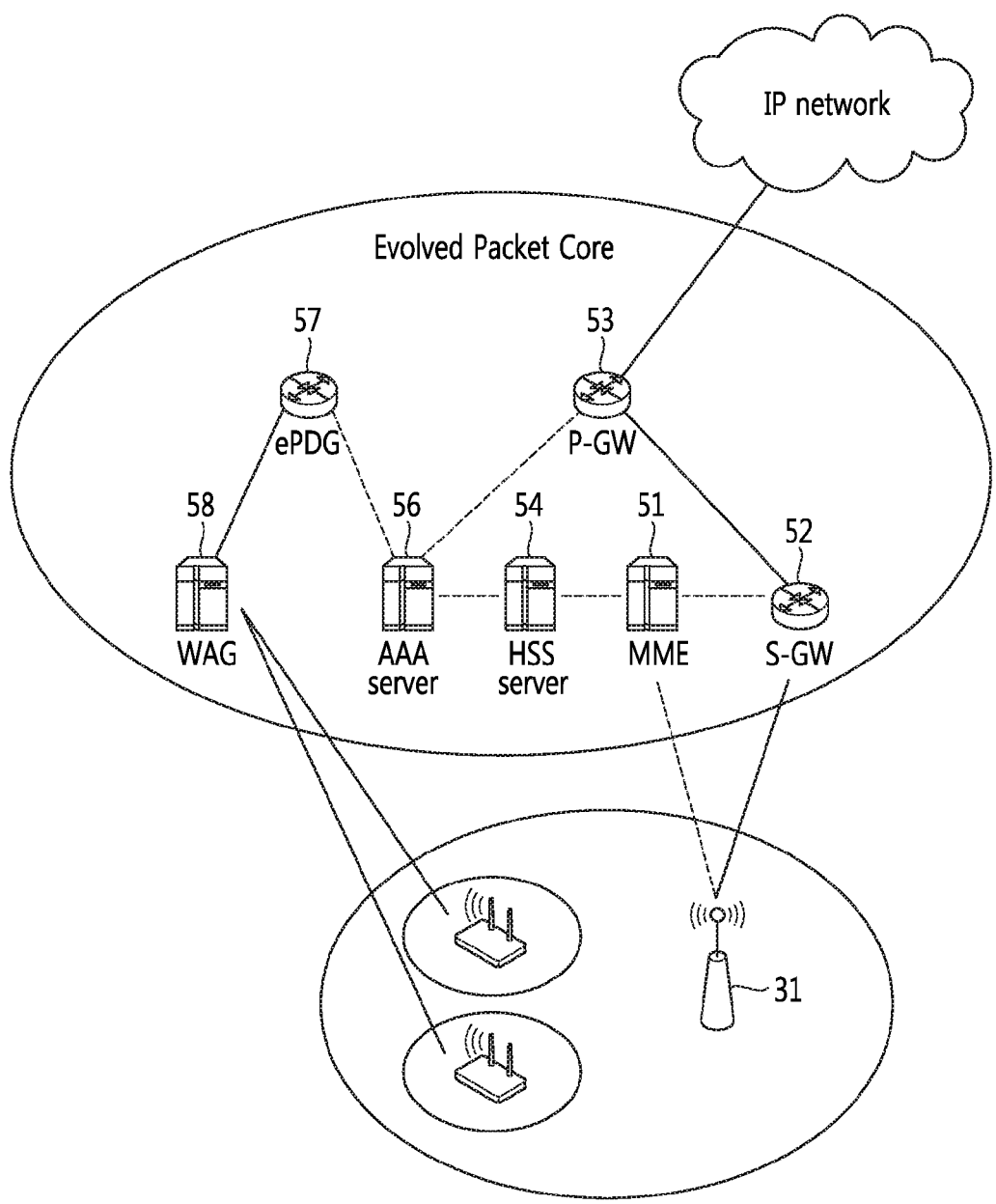
FIG. 2 is a schematic diagram illustrating a network structure to which a small cell or a WLAN AP is added.
Figure 3:
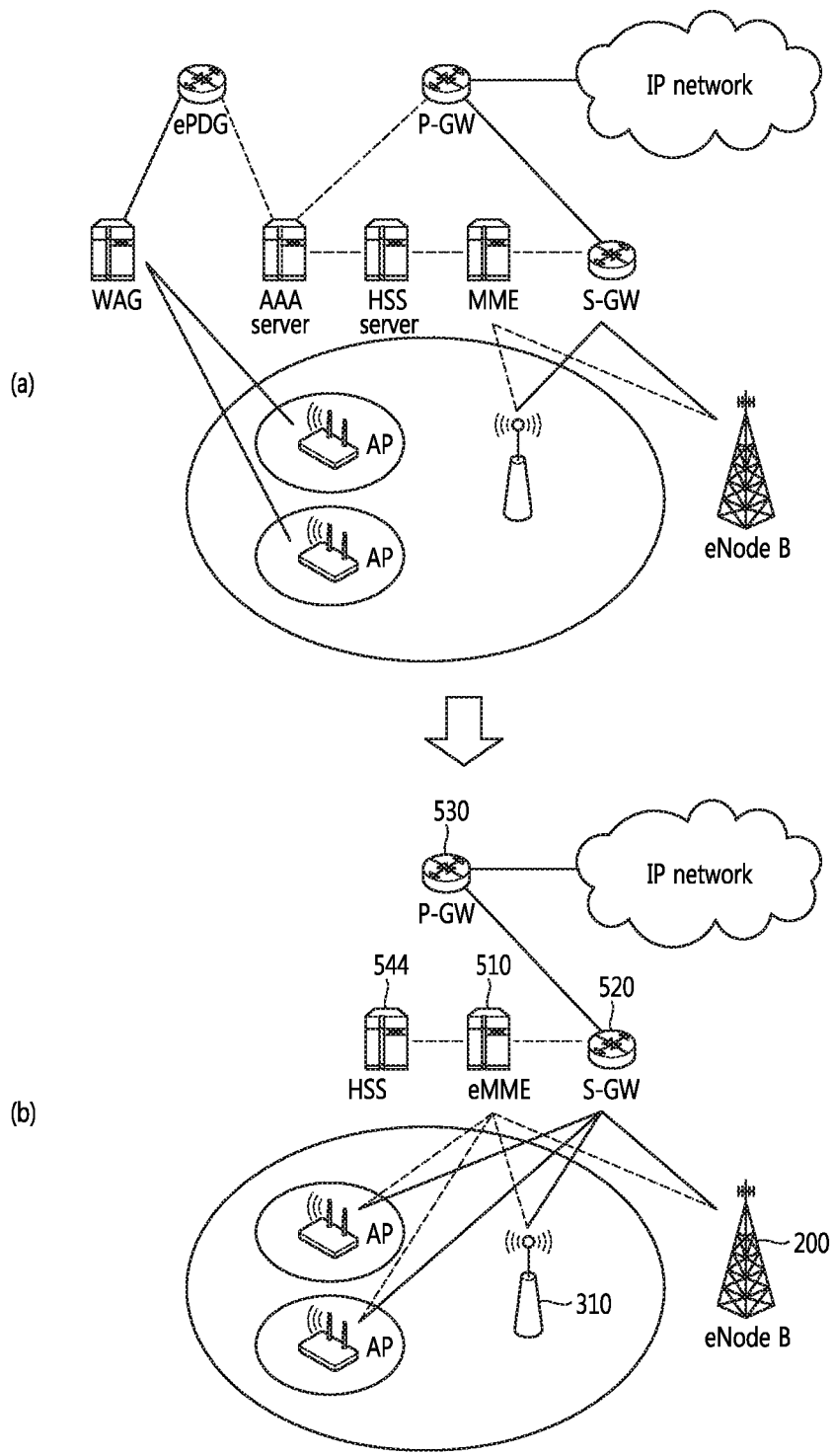
FIG. 3 is a diagram illustrating an example by comparing the existing mobile communication network structure and a network structure improved according to the present invention.

FIG. 3 is a diagram illustrating an example by comparing the existing mobile communication network structure and a network structure improved according to the present invention.

In comparison with the existing mobile communication network structure shown in FIG. 3(a), an enhanced MME (eMME) 510 and an enhanced GW (eGW) 520 may be included according to the improved network structure shown in FIG. 3(b). Although it is depicted that the eMME 510 and the eGW 520 are separated in FIG. 3(b), the eMME 510 and the eGW 520 may be separated only in logical manner, but combined in a device in physical manner. In addition, although it is depicted that the eGW 520 and a P-GW 530 are separated in FIG. 3(b), the eGW 520 and the P-GW 530 may be combined in a device.

The eMME 510 may be connected to a WLAN access point (AP) as well as an eNodeB 200 and a BS 310. For this, a new interface may be added between the eMME 510 and the WLAN AP. Similarly, the eGW 520 may be connected to the WLAN access point (AP) as well as the eNodeB 200 and the BS 310. For this, a new interface may be added between the eGW 520 and the WLAN AP.

FIG. 4a to FIG. 4d are a conceptual diagram illustrating a construction of radio entity (RE) that manages a BS and a WLAN AP integrally for a multi-RAT UE according to the present invention.

First, a radio entity (RE; or radio access device) 300 is a newly introduced device according to the present invention, and makes the management of the BS 310 and the WLAN AP 320 more easy in order to strengthen a support of the multi-RAT UE 100. Such a RE has various types according to the present invention.

Figure 4A:
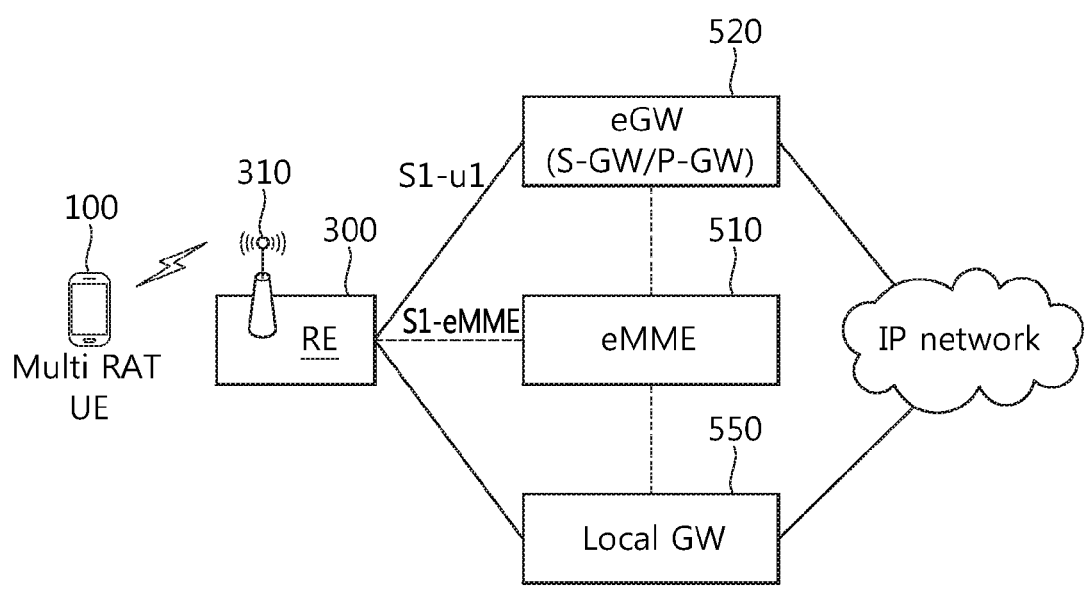
FIG. 4a to FIG. 4d are a conceptual diagram illustrating a construction of radio entity (RE) that manages a base station and a WLAN AP integrally for a multi-RAT UE according to the present invention.

FIG. 4a illustrates a concept of RE according to a first type, and the RE 300 according to the first type supports only the cellular BS 310. At the moment, the RE 300 of the first type may be integrated within the cellular BS 310. The RE 300 of the first type is connected to an eGW 520 and a local GW 550 for the transmission and reception of user data, and connected to an eMME 510 for the transmission and reception of control data. The eGW 520 may perform one or more function of the S-GW and the P-GW. The local GW 550 is a gateway that enables the RE to access to a home network of a home or an office.

The multi-RAT UE 100 and the RE 300 may be connected through an access stratum (AS) protocol, and the multi-RAT UE 100 and the eMME 510 may be connected through a non access stratum (NAS) protocol which is an interface between a UE and a core network.

As shown in FIG. 4a, an interface called S1-eMME may be formed between the RE 300 and the eMME 510, and an interface called S1-U1 may be formed between the RE 300 and the eGW 520.

Figure 4B:
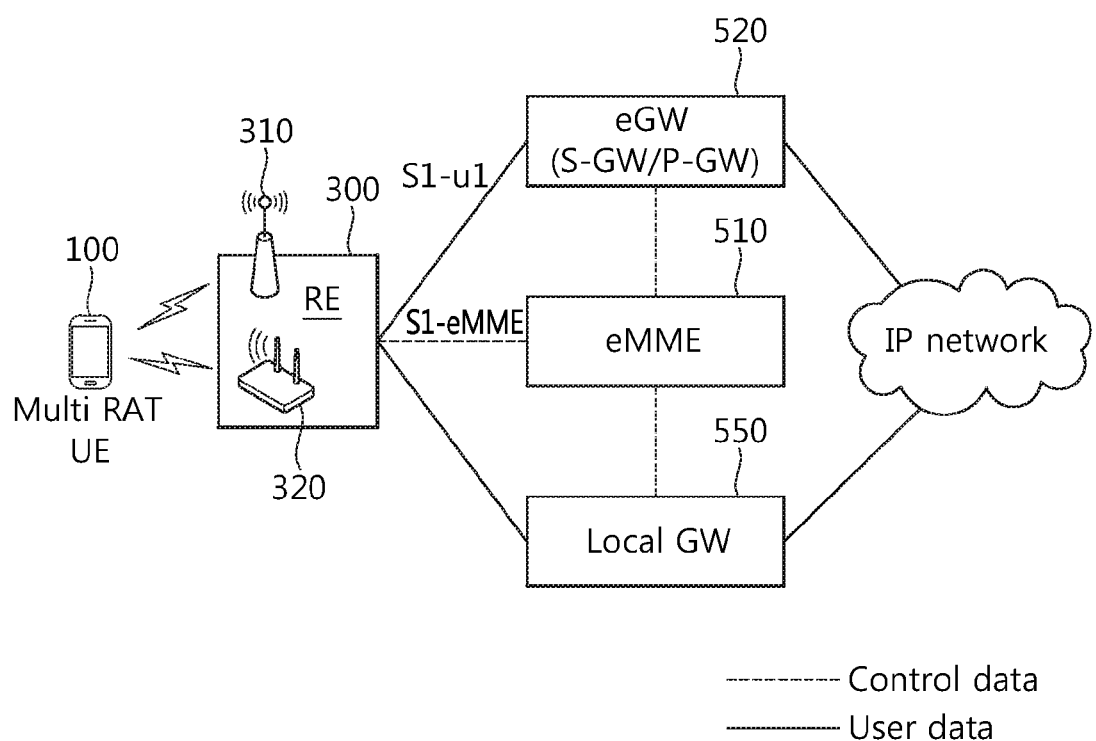

FIG. 4b illustrates a concept of RE according to a second type, and the RE 300 according to the second type supports both the cellular BS 310 and the WLAN AP 320. At the moment, the RE 300 according to the second type may be a device that integrates the cellular BS 310 and the WLAN AP 320.

According to FIG. 4b, the multi-RAT RE 100 may be connected to the RE 300 through at least one of the cellular link or the Wi-Fi link.

Figure 4C:
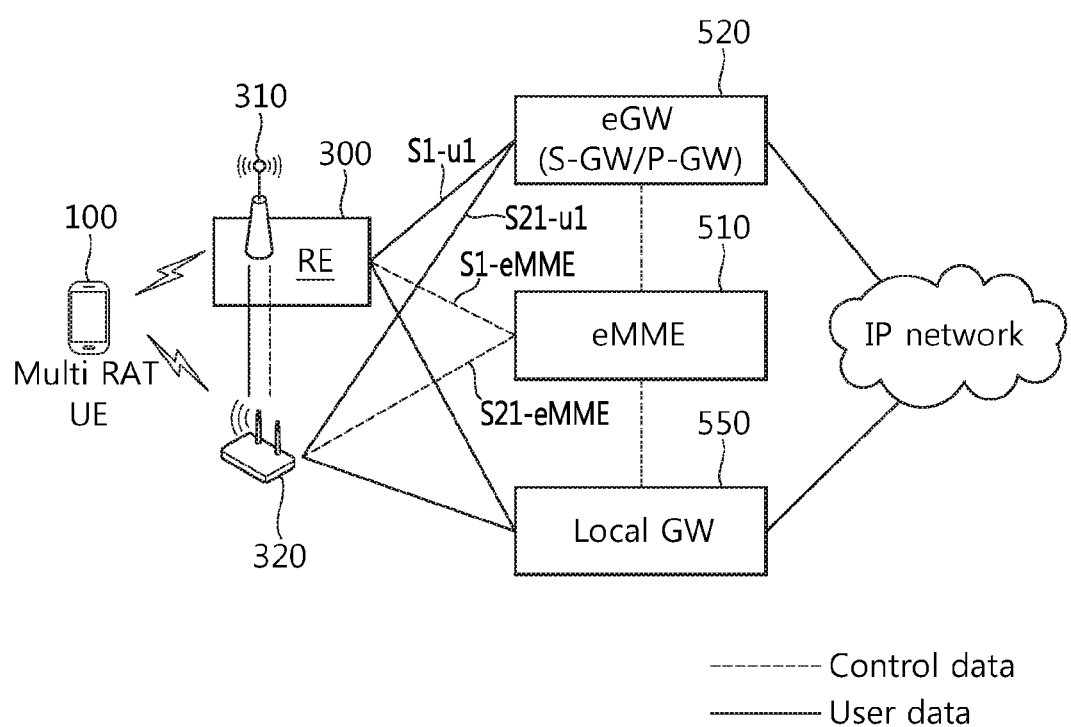

FIG. 4c illustrates a concept of RE according to a third type, and the RE 300 according to the third type is integrated within the cellular BS 310. However, there exists an interface between the RE according to the third type and the WLAN AP 320.

As shown in FIG. 4c, an interface called S21-U1 may be formed between the WLAN AP 320 and the eGW 520, and an interface called S21-eMME may be formed between the WLAN AP 320 and the eMME 510.

According to FIG. 4c, in case that the multi-RAT UE 100 is available to communicate through the Wi-Fi link, a UE may directly access to a core network through the WLAN AP 320, and access to the core network via the RE 300 by using an interface between the WLAN AP 320 and the RE 300.

In case of the RE 300 according to the third type, even though the multi-RAT UE 100 is connected to the WLAN AP 320 through the Wi-Fi link, the RE 300 may be a subject to manage the connection between the WLAN AP 320 and the core network.

Figure 4D:
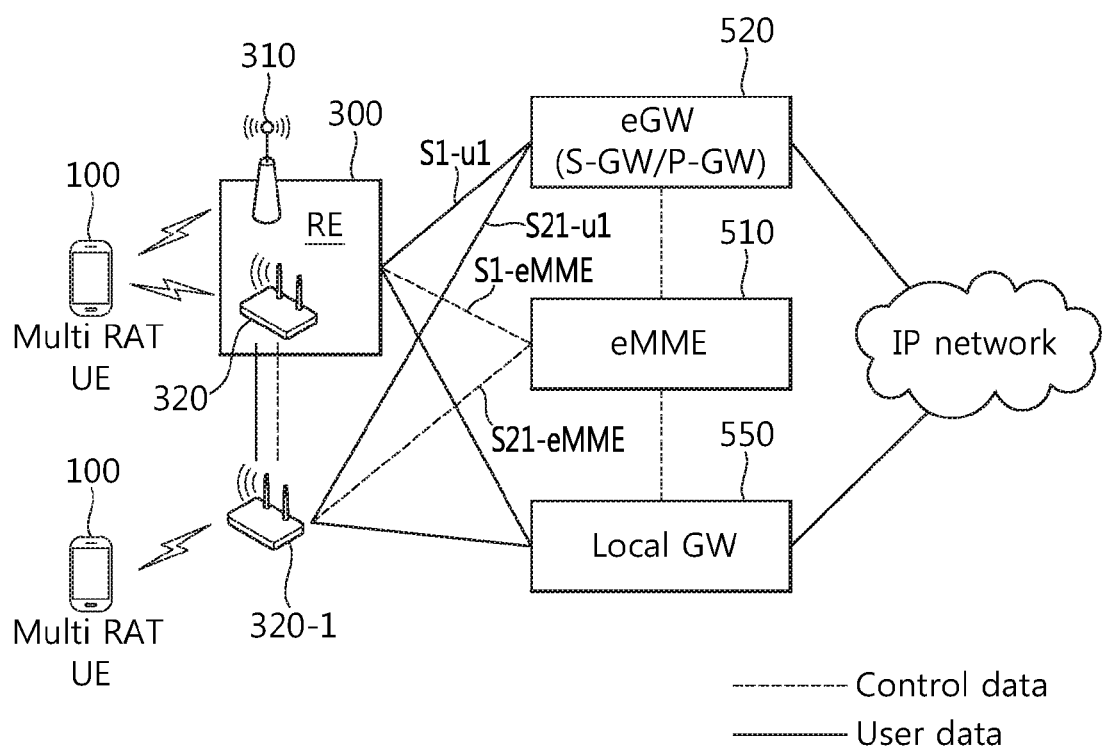

FIG. 4d illustrates a concept of RE according to a fourth type, and the RE according to the fourth type has a concept that the RE according to the second type and the RE according to the third type are mixed. That is, the RE 300 according to the fourth type is a device that integrates the cellular BS 310 and the WLAN 320. And an interface may be additionally existed between the RE according to the fourth type and an external WLAN AP 320-1.

The multi-RAT UE 100 may access to the core network by being connected to the RE 300 through at least one of the cellular link or the Wi-Fi link, and access to the core network through the WLAN 320 in case that the multi-RAT UE is available to communicate through the Wi-Fi link. Or, as described for the third type, the multi-RAT UE 100 may access to the core network via the RE 300 by using an interface between the WLAN AP 320 and the RE 300.

Hereinafter, according to a connection state between the multi-RAT UE 100 and the RE 300 or the WLAN AP 320, the connection and the state change between the multi-RAT UE 100 and the core network, for example, the eMME 510 will be described.

As described above, according to the present invention, the RE 300 may be existed in a plurality of types and the multi-RAT RE 100 may be connected to the RE 300 through at least one of the cellular link and the Wi-Fi link. Hereinafter, in the present invention, the module for managing the connection between the multi-RAT RE 100 and the RE 300 by being switched between an activated state and a deactivated state depending on the connection state between the multi-RAT UE 100 and the RE 300 is defined as a common radio connection management (CRCM).

Figure 5:
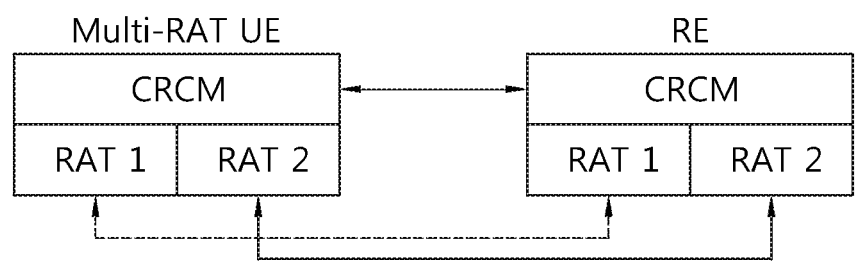
FIG. 5 is a diagram for describing a state of CRCM between a UE and a RE according to an embodiment of the present invention.
Figure 6:
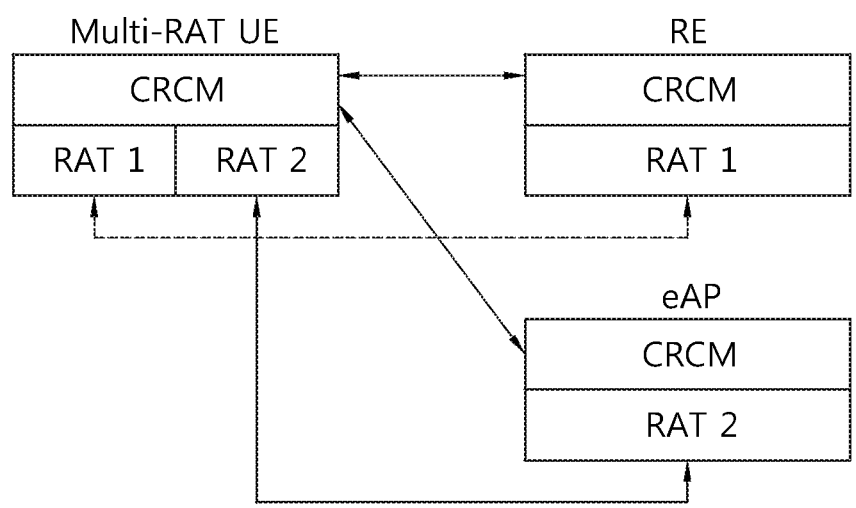
FIG. 6 is a diagram for describing a state of CRCM between a UE and a RE according to another embodiment of the present invention.

FIG. 5 and FIG. 6 are diagrams for describing a state of CRCM between a UE and a RE according to an embodiment of the present invention. FIG. 5 illustrates a case that the RE 300 is the second type shown in FIG. 4b and FIG. 6 illustrates a case that the RE 300 is the third type shown in FIG. 4c.

As shown in FIG. 5, the multi-RAT UE 100 may be connected to the RE 300 through a first RAT (RAT 1), and connected to the RE 300 through a second RAT (RAT 2). In this case, when the multi-RAT UE 100 is connected to the RE 300 through at least one RAT, the CRCM is in the activated state.

As shown in FIG. 6, the multi-RAT UE 100 may be connected to the RE 300 through the first RAT (RAT 1), and connected to the WLAN AP 320 through the second RAT (RAT 2). In this case, since an interface exists between the RE 300 and the WLAN AP 320, when the multi-RAT UE 100 becomes a state available to communicate through any one RAT, the CRCM is in the activated state.

As shown in FIG. 6, in case that the multi-RAT UE 100 is in a connected state to a plurality of radio access device, for example, the RE 300 or the WLAN AP 320, the CRCM may be managed by a specific device, the RE 300 in FIG. 6.

Table 1 represents states of CRCM between the multi-RAT RE 100 and the RE 300.

TABLE 1

| State of CRCM | State of RAT 1 | State of RAT 2 |
| --- | --- | --- |
| Deactivated | Idle | Idle |
| Activated | Idle | Connected |
| Activated | Connected | Idle |
| Activated | Connected | Connected |

Except the case that both the first RAT and the second RAT are in an idle state, that is, at least one of a state of the first RAT and a state of the second RAT is in the connected state, the CRCM is in the activated state.

In case that a radio connection relation is released and/or disassociated or a radio link is failure or in user inactivated, the state of RAT may be switched from the connected state to the idle state.

Figure 7:
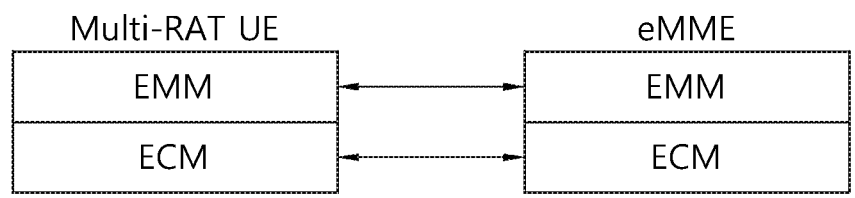
FIG. 7 is a diagram illustrating a NAS protocol between a UE and a core network.

FIG. 7 illustrates a NAS protocol between a UE and a core network, and the connection state and the mobility between the multi-RAT UE 100 and the eMME 510 are managed through the NAS protocol.

Although the evolved connection management (ECM) of FIG. 7 is similar to the existing EPS connection management (ECM), conditions for being changed to a connection state and an idle state are different.

Although the evolved mobility management (EMM) is also similar to the existing EPS mobility management (EMM), the conditions for being changed to a registered state and a deregistered state are different.

Figure 8:
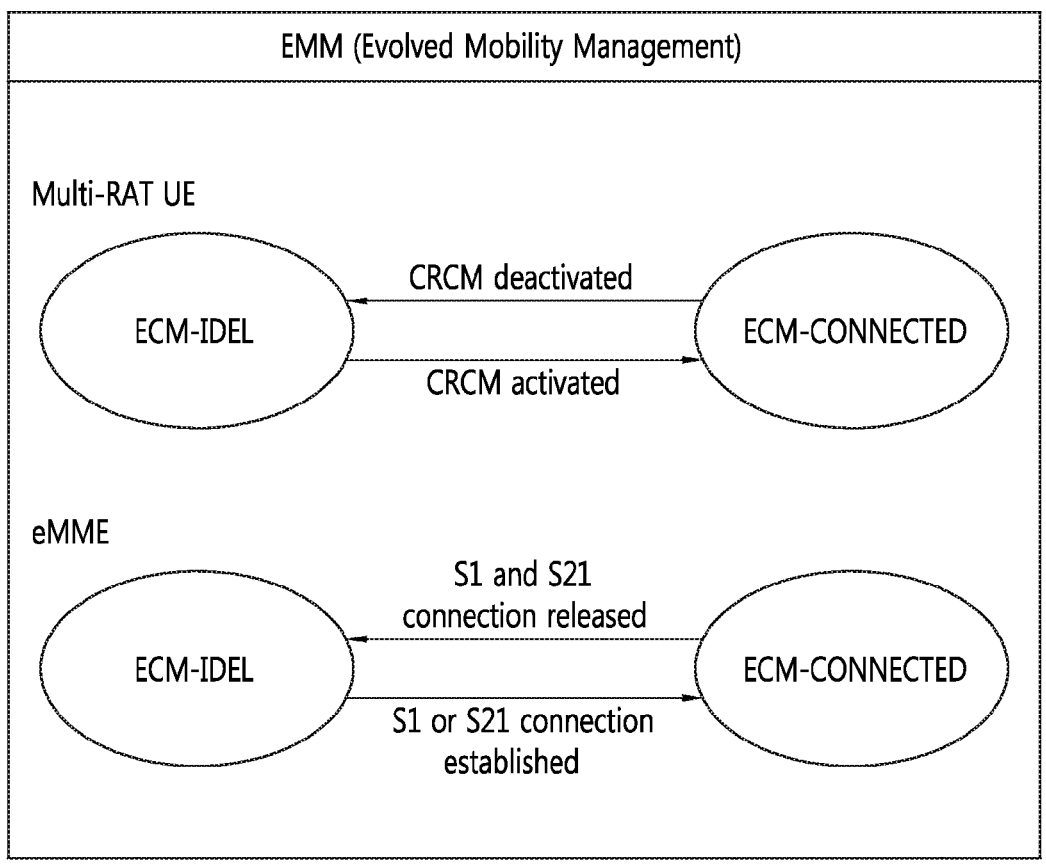
FIG. 8 is a diagram illustrating an ECM state transit according to an embodiment of the present invention.

FIG. 8 is a diagram illustrating an ECM state transit according to an embodiment of the present invention.

As shown in FIG. 8, the ECM state of a multi-RAT UE and an eMME may be changed between an idle state and a connection state depending on a predetermined condition or a situation.

According to the embodiment, the ECM state of the multi-RAT UE may be changed depending on the states of CRCM represented in Table 1. That is, when the CRCM is in an activated state, the ECM may be changed from the idle state to the connection state, and when the CRCM is in a deactivated state, the ECM may be changed from the connection state to the idle state.

In case of the existing EPS connection management (ECM), the ECM state is changed depending on the RRC state between a UE and a BS. That is, since the existing BS allows only the access of UE through the cellular network, the BS does not have the CRCM module. Accordingly, even though the radio connection is established through the Wi-Fi, the ECM is in the idle state if the RRC connection is released.

According to the present invention, if at least one of a plurality of RAT is connected, the CRCM state is in the activated state, and the ECM is also switched to the connection state by being linked to the CRCM state. Reversely, if the CRCM state is switched from the activated state to the deactivated state, the ECM is also switched to the idle state.

On the other hand, the CRCM state may be switched by being linked to the state of ECM. That is, if the ECM is in the connection state, the CRCM state becomes the activated state, and if the ECM is switched from the connection state to the idle state, the CRCM is also switched to the deactivated state.

Meanwhile, from the standpoint of the eMME 510, depending on the RE 300 or the WLAN AP 320 which is a wireless node and depending on the connection state of S1 or S2 which is an interface of the eMME 510, the ECM state is switched.

As shown in FIG. 8, in case that the connection state of both S1 and S21 is released, the ECM may be switched from the connection state to the idle state, and in case that the connection state of S1 or S21 is established, the ECM may be switched from the idle state to the connection state.

In case that the connection of S1 or S21, that is, at least one connection of S1 and S21 is established, the ECM is in the connection state, and in case that both S1 and S21 are released, the ECM is switched from the connection state to the idle state.

Meanwhile, the connection for S1 and/or S21 may be released by being triggered by the RE 300 or the WLAN AP 320. For example, depending on the CRCM state transit, that is, when an event of switching from the activated state to the deactivated state occurs or an event of switching from the connection state to the idle state of the RAT occurs, the connection for S1 and/or S21 may be released. The case that the state of RAT is switched may be applied to the case that the multi-RAT UE 100 is accessed to a plurality of radio access devices, and S1 and S21 may be independently released depending on the state of RAT.

In addition, the connection for S1 and/or S21 may be released in case that power off of the RE 300 or the WLAN AP 320 occurs such as the case that a configuration update is triggered through the WLAN AP 320 or the RE 300.

Furthermore, the connection for S1 and/or S21 may be released by being triggered by the eMME 510. For example, this corresponds to the case of authentication failure or that the EMM state is changed from the registered state to the deregistered state. If the power off of the RE 300 or the WLAN AP 320 occurs, the EMM state may be changed from the registered state to the deregistered state.

Figure 9:
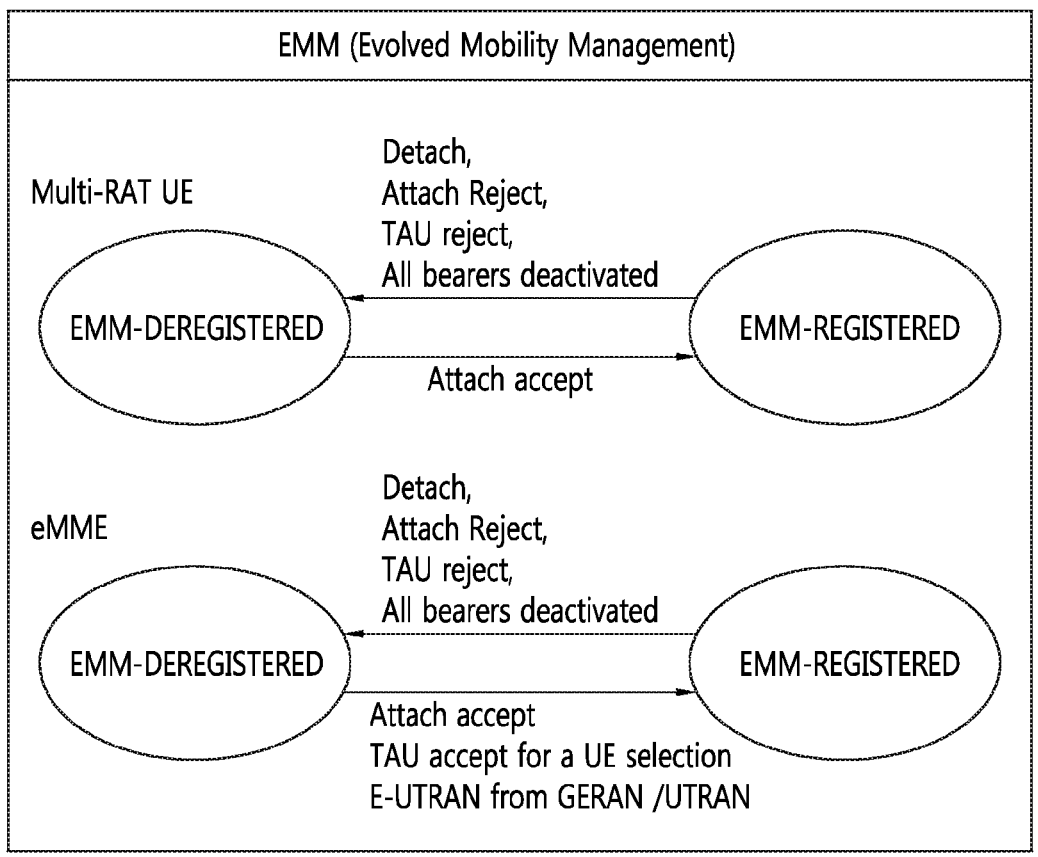
FIG. 9 is a diagram illustrating an EMM state transit according to an embodiment of the present invention.

FIG. 9 is a diagram illustrating an EMM state transit according to an embodiment of the present invention.

As shown in FIG. 9, the EMM state of a multi-RAT UE 100 and an eMME 510 may be changed between a registered state and a deregistered state depending on a predetermined condition or a situation.

From the standpoint of the multi-RAT UE 100, if detachment or attachment is rejected (Detach, Attach Reject), the tracking area update (TAU) is rejected (TAU reject), or all of the bearers are deactivated (All bearers deactivated), the EMM is switched from the registered state to the deregistered state. On the other hand, if the attachment is accepted (Attach accept), the EMM is switched from the deregistered state to the registered state.

For the existing EPS mobility management (EMM), in case that an E-UTRAN interface is switched off due to the handover to non-3GPP, the EMM state is switched from the registered state to the deregistered state. This is because the connection of radio interface is coupled to the connection of core network with each other.

However, according to the present invention, even though the handover to non-3GPP, that is, the handover from the cellular link to the Wi-Fi link occurs, the EMM may maintain the registered state.

In considering the EMM state from the standpoint of the eMME 510, as shown in FIG. 9, if detachment or attachment is rejected (Detach, Attach Reject), the tracking area update (TAU) is rejected (TAU reject), or all of the bearers are deactivated (All bearers deactivated), the EMM is switched from the registered state to the deregistered state.

On the other hand, if attachment is accepted (Attach accept) or the tracking area update (TAU) for a UE selection is accepted (TAU accept for a UE selecting), the EMM is switched from the deregistered state to the registered state.

Figure 10:
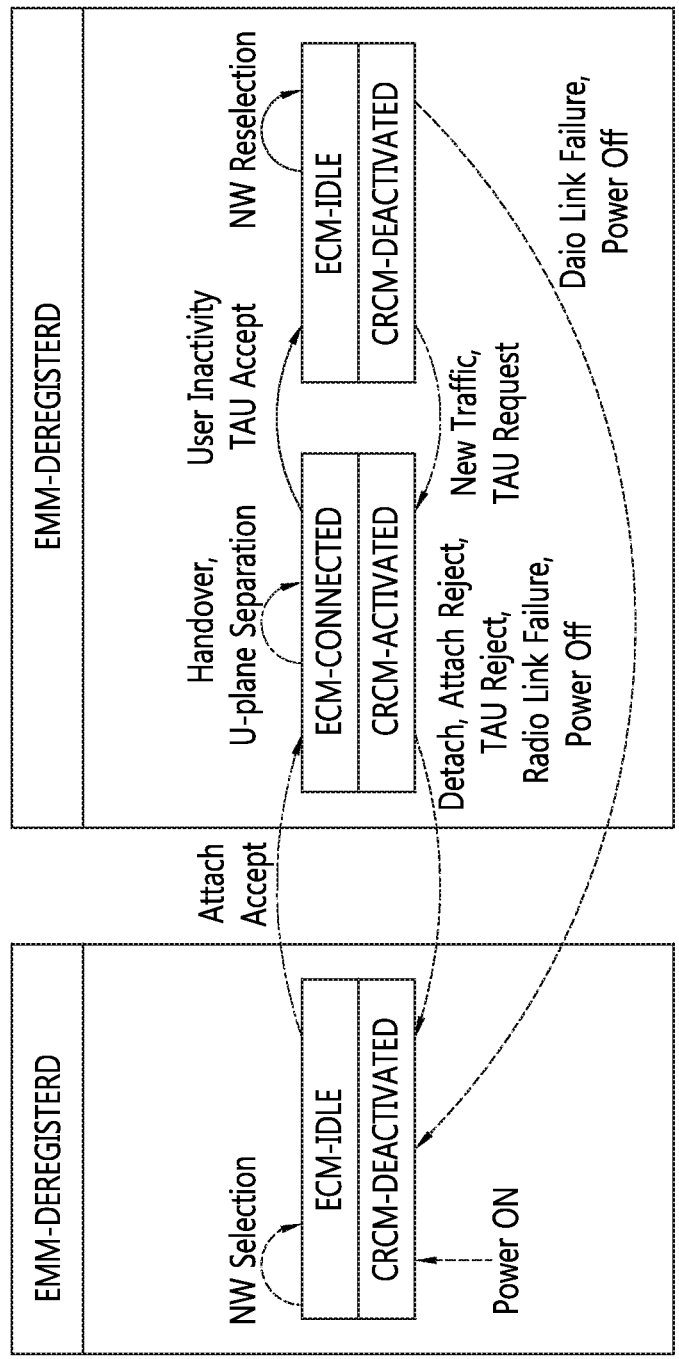
FIG. 10 is a diagram illustrating a state transit through a NAS protocol according to an embodiment of the present invention.

FIG. 10 is a diagram illustrating a state transit through a NAS protocol according to an embodiment of the present invention. That is, FIG. 10 shows the state transit of EMM that corresponds to the state of CRCM and ECM.

As shown in FIG. 10, the state of CRCM and ECM is switched by being interconnected with each other, and the state of EMM is switched according to a specific event.

In a situation that the ECM is in an idle state, the CRCM is in a deactivated state, and the EMM is in a deregistered state, power may be supplied and network may be selected (NW selection). In case that the EMM is in the deregistered state, the core network may not know the existence of a multi-RAT UE 100.

If attachment is accepted (Attach Accept), the ECM is switched to a connection state, and the CRCM is switched to an activated state. Furthermore, the EMM is also switched to a registered state. In this state, even though handover or user plane separation (U-plane Separation) occurs, an additional state transit does not occur.

While the EMM is in the registered state, if detachment or attachment is rejected or the TAU is rejected, or if radio link failure or power off occurs, the EMM is changed to the deregistered state, and the ECM and the CRCM also switch to the idle state and the deactivated state.

While the EMM is in the deregistered state, the ECM is in the connection state and the CRCM is in the activated state, if there is no user activity (User Inactivity) or the TAU is accepted (TAU Accept), the ECM is switched from the connection state to the idle state, and the CRCM is switched from the activated state to the deactivated state. However, even in this case, the state of EMM is maintained in the registered state.

If a new communication occurs (New Traffic) or the request for TAU occurs, the ECM is switched from the idle state to the connection state again, and the CRCM is switched from the deactivated state to the activated state.

In case that a radio link is failed during an event that the EMM is switched from the registered state to the deregistered state, a state transit does not occur if any one of a plurality of RATs are connected to the radio link. That is, a state transit due to the radio link failure of any one of the plurality of RATs does not occur.

Figure 11:
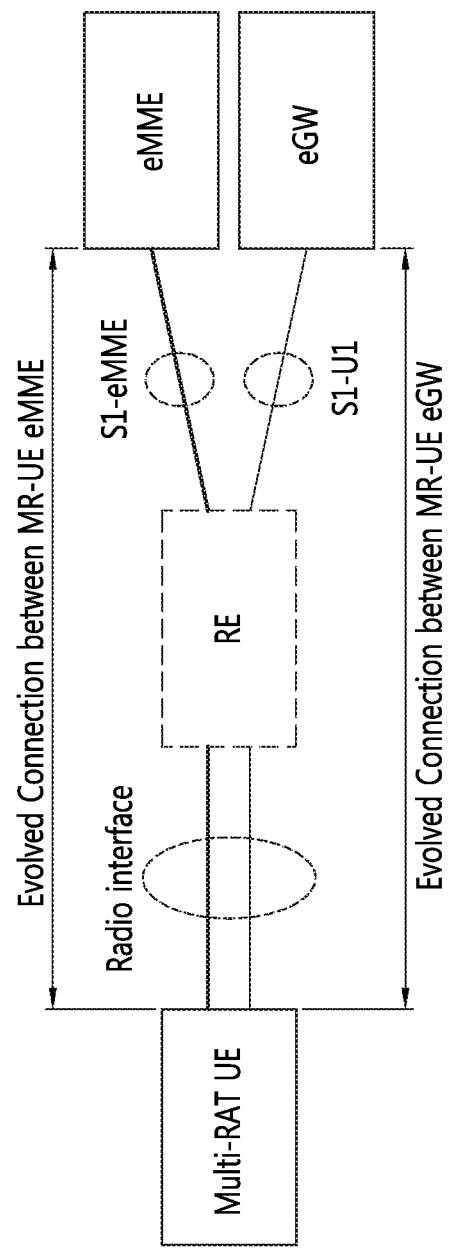
FIG. 11 is a diagram for describing an interface of RE and core network according to an embodiment of the present invention.

FIG. 11 is a diagram for describing an interface of RE and core network according to an embodiment of the present invention.

As shown in FIG. 11, a multi-RAT UE may be connected to an eMME or an eGW via a RE. A radio interface is formed through a cellular link or a Wi-Fi link between the multi-RAT UE and the RE. And the RE forms an S1-eMME interface with the eMME and forms an S1-U1 interface with the eGW.

Between the multi-RAT UE and the eMME, a NAS message for a connection (Evolved Connection or connection establishment) and a session (evolved session or session establishment) may be transmitted or received through the RE. A session is setup between the eGW and the UE through the NAS message. Through the session which is setup, user data may be transmitted or received.

The connection between a UE and a core network according to the present invention is a narrow concept, and may signify the case that the connection of FIG. 11 is established (connection establishment) or the case that both of the connection and the session of FIG. 11 are established.

Figure 12:
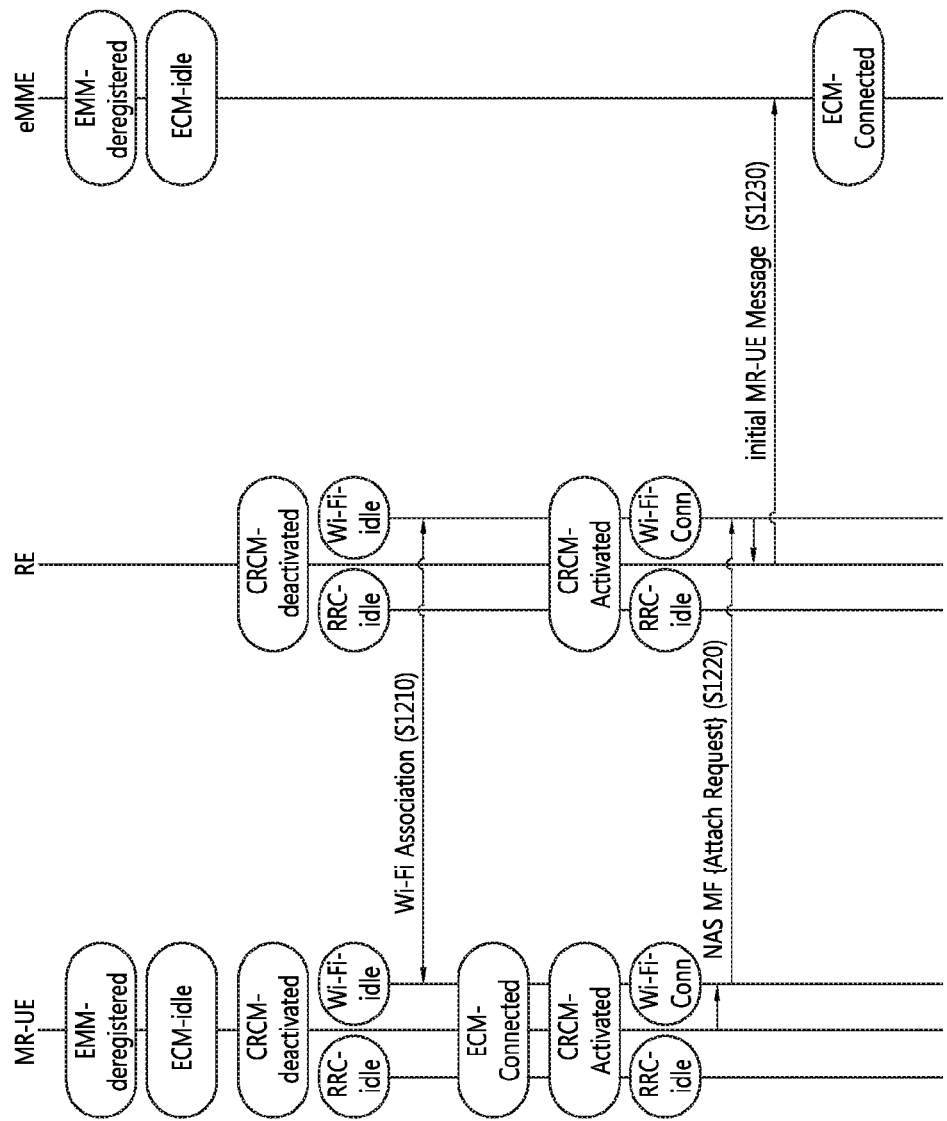
FIG. 12 is a control flowchart for describing a connection between a UE and a core network according to an embodiment of the present invention.

FIG. 12 is a control flowchart for describing a connection between a UE and a core network according to an embodiment of the present invention. Particularly, FIG. 12 is a diagram for describing a connection establishment process between a multi-RAT UE and an eMME in case that the multi-RAT UE and a RE are available to communicate through a Wi-Fi link.

As shown in FIG. 12, since any connection relation is not established between the multi-RAT UE (MR-UE in the drawing) and the eMME initially, the EMM of the multi-RAT UE and the eMME is in the deregistered state, and the ECM is also in the idle state. In addition, since both a RRC module and a Wi-Fi module are in the idle state before a link is generated between the multi-RAT UE and the RE through a radio interface, the CRCM is also in the deactivated state.

If a Wi-Fi association for forming a Wi-Fi link between the multi-RAT UE and the RE occurs (step, S1210), the ECM of the multi-RAT UE is in the connection state and the CRCM which is linked to the ECM is also switched to the activated state.

The multi-RAT UE may know through scanning which type the RE is, authentication or association, and through this, determine whether to perform a connection process using a NAS protocol such as attachment.

During the Wi-Fi association process, the multi-RAT UE may deliver an association cause to the RE. For example, the association cause may be emergency, high priority access, MT-access, MO-signaling, MO-data, delay tolerant access, and so on.

Furthermore, during the Wi-Fi association process, the multi-RAT UE may deliver an authentication scheme to be used to the RE, and such an authentication scheme may be the existing authentication scheme which is used for the cellular interface or the Wi-Fi interface.

As such, when a radio link is formed between the multi-RAT UE and the RE, the multi-RAT UE may transmit a NAS message (NAS MF {Attach Request}) for a connection with the eMME through the RE (step, S1220).

The RE that receives the NAS message transmits an initial MR-UE message to the eMME (step, S1230).

The initial MR-UE message may include a RE MR-UE S1AP ID, a NAS-PDU: Attach Request, a TAI, an association cause and an evolved cell global ID (ECGI). The ECGI represents identifier information that enables the eMME to know through which wireless node (RE or WLAN AP) is setup for a specific session for the MR-UE practically.

In this case, the Wi-Fi index for representing that the current multi-RAT UE and the RE are connected through the Wi-Fi interface may be determined during an S1-eMME setup process, and this may be signaled as one of cell IDs.

Table 2 below represents cell IDs and description for the cell IDs.

TABLE 2

| Cell ID | Descriptions |
|---------|--------------|
| 000001  | Cellular #1  |
| ...     | ...          |
| 100001  | Collocated Wi-Fi #1 |

According to Table 2, "000001" of cell IDs represents that the multi-RAT UE is connected wirelessly through the cellular interface, and "100001" is a Wi-Fi index that represents that the multi-RAT UE is connected wirelessly through the WLAN AP included in the RE that supports both a cellular BS and the WLAN AP.

The eMME that receives the cell ID may detect that the UE requesting a connection through the NAS protocol is a UE accessed through Wi-Fi, and may implicitly know that the UE may perform an authentication process with the existing authentication scheme which is used in Wi-Fi.

Table 3 represents information that includes the cell IDs in Table 2.

TABLE 3

| MCC (Mobile Country Code) | MNC (Mobile Network Code) | RE ID | Cell ID |
|---------------------------|---------------------------|-------|---------|

Meanwhile, as a frame (NAS transfer frame) used for transmitting the NAS message, the existing IEEE 802.11 MAC frame format may be used. MF (management MAC frame) or CF (control MAC frame), and so on may be used for the MAC frame.

The NAS message may be transmitted using a reserved value within a frame control. Table 4 represents types of information signaled in the frame control, subtypes and description for the types.

TABLE 4

| Type value b3 b2 | Type description | Subtype value b7 b6 b5 b4 | Subtype description |
| --- | --- | --- | --- |
| 10 | Data | 1101 | Reserved |
| 10 | Data | 1110 | QoS CF-Poll (no data) |
| 10 | Data | 1111 | QoS CF-Ack - CF-Poll (no data) |
| 11 | Reserved | 0000-1111 | Reserved |

For example, the values of types and subtypes within the frame control may be defined as follows so as to imply a NAS transmission message.

Type 0b11: Inter-RAT management
Subtype 0b1000: NAS Transfer

According to another example, the NAS message may be transmitted through a data MAC frame.

For example, an address field value within a MAC header may be defined as follows such that the transmitted message represents the NAS transmission message.

When the MR-UE transmits the NAS message: Destination address=MAC Address of an associated Wi-Fi NW entity (RE, WLAN AP)

When associated Wi-Fi NW entity transmits the NAS message: Source address=MAC Address of an associated Wi-Fi NW entity FIG. 13 is a control flowchart for describing a session establishment between a UE and a core network according to an embodiment of the present invention.

Figure 13:
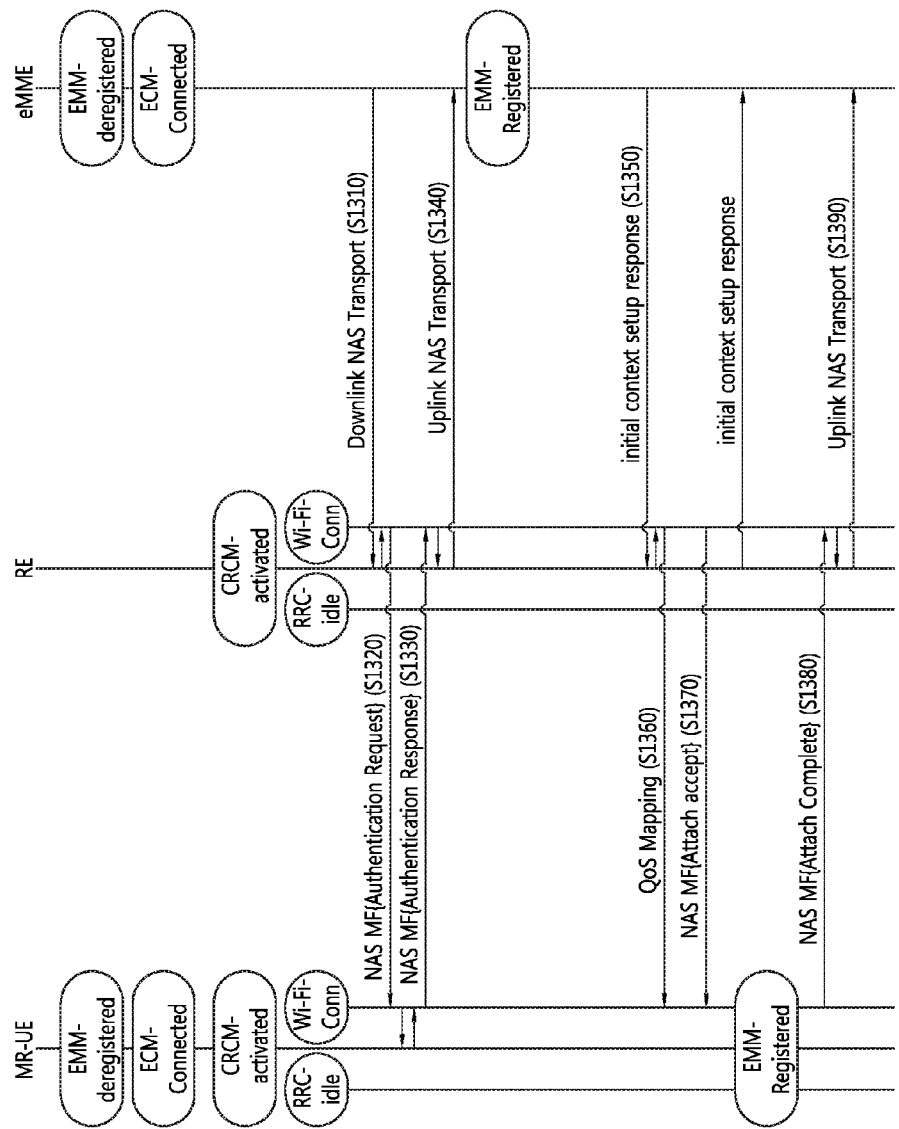
FIG. 13 is a control flowchart for describing a session establishment between a UE and a core network according to an embodiment of the present invention.

As shown in FIG. 13, if an authentication with a mobile communication core network for a data path connection is performed when the EMM of a multi-RAT UE and an eMME is in the deregistered state, the eMME transmits a downlink NAS message to a RE (step, S1310). The downlink NAS message may include an eMME MR-UE S1AP ID, a RE MR-UE S1AP ID, a NAS-PDU-authentication request, and so on.

The RE and the multi-RAT UE may exchange an authentication request and an authentication response for the NAS connection (steps, S1320 and S1330).

The RE transmits the NAS message for uplink to the eMME (step, S1340), and if the eMME receives the NAS message, the EMM of the eMME is switched to the registered state. The NAS message for uplink may include an eMME MR-UE S1AP ID, a RE MR-UE S1AP ID, a NAS-PDU-authentication response, and so on.

When the EMM of the eMME is switched to the registered state, an initial context setup request message is transmitted from the eMME to the RE (step, S1350). The initial context setup request message may include an eMME MR-UE S1AP ID, a RE MR-UE S1AP ID, an E-RAB ID, QoS, an S1 eGW TEID, a NAS-PDU-Attach Accept, and so on.

When the initial context setup request message is transmitted from the eMME to the RE, a QoS mapping message for a core network and a WLAN AP and the NAS message for accepting attachment (attach accept) are transmitted from the RE to the multi-RAT UE (steps, S1360 and S1370).

When the NAS message for accepting attachment is received, the EMM state of the multi-RAT UE is switched to the registered state. The multi-RAT UE may deliver the NAS message for completing attachment (attach complete) (NAS MF {Attach Complete}, Uplink NAS Transport (eMME MR-UE S1AP ID, RE MR-UE S1AP ID, NAS-PDS: Attach complete)) to the eMME via the RE (steps, S1380 and S1390).

Figure 14:
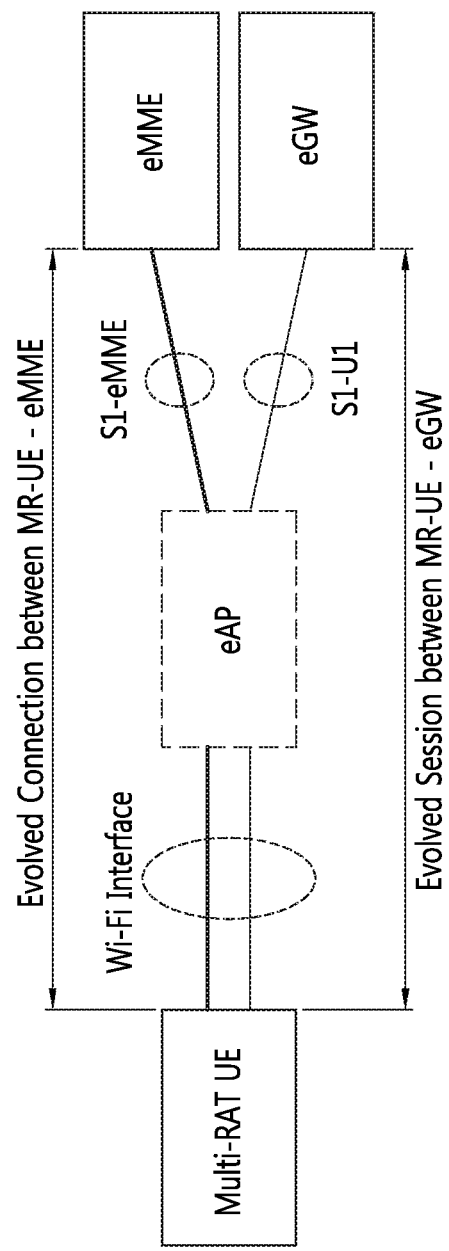
FIG. 14 is a diagram for describing an interface of an eAP and a core network according to another embodiment of the present invention.

FIG. 14 is a diagram for describing an interface of an eAP and a core network according to another embodiment of the present invention.

As shown in FIG. 14, a multi-RAT UE may be connected to an eMME or an eGW via an enhanced AP (eAP). Between the multi-RAT UE and the eAP, a radio interface through a Wi-Fi link is formed. The eAP may form an S21 interface with the eMME, and form an S21-U interface with the eGW.

Between the multi-RAT UE and the eMME, a NAS message for a connection (Evolved Connection or connection establishment) may be transmitted or received through the eAP between the multi-RAT UE and the eMME, and between the multi-RAT UE and the eGW, a NAS message for a session (Evolved Session or session establishment) may be transmitted or received. Or, the NAS message for the session may be transmitted or received between the multi-RAT UE and the eMME.

The eAP of FIG. 14 may include the WLAN AP of FIG. 4, and the eAP according to the embodiment may perform an interface connection by a core network and a NAS protocol through a communication with the eMME of the core network.

Figure 15:
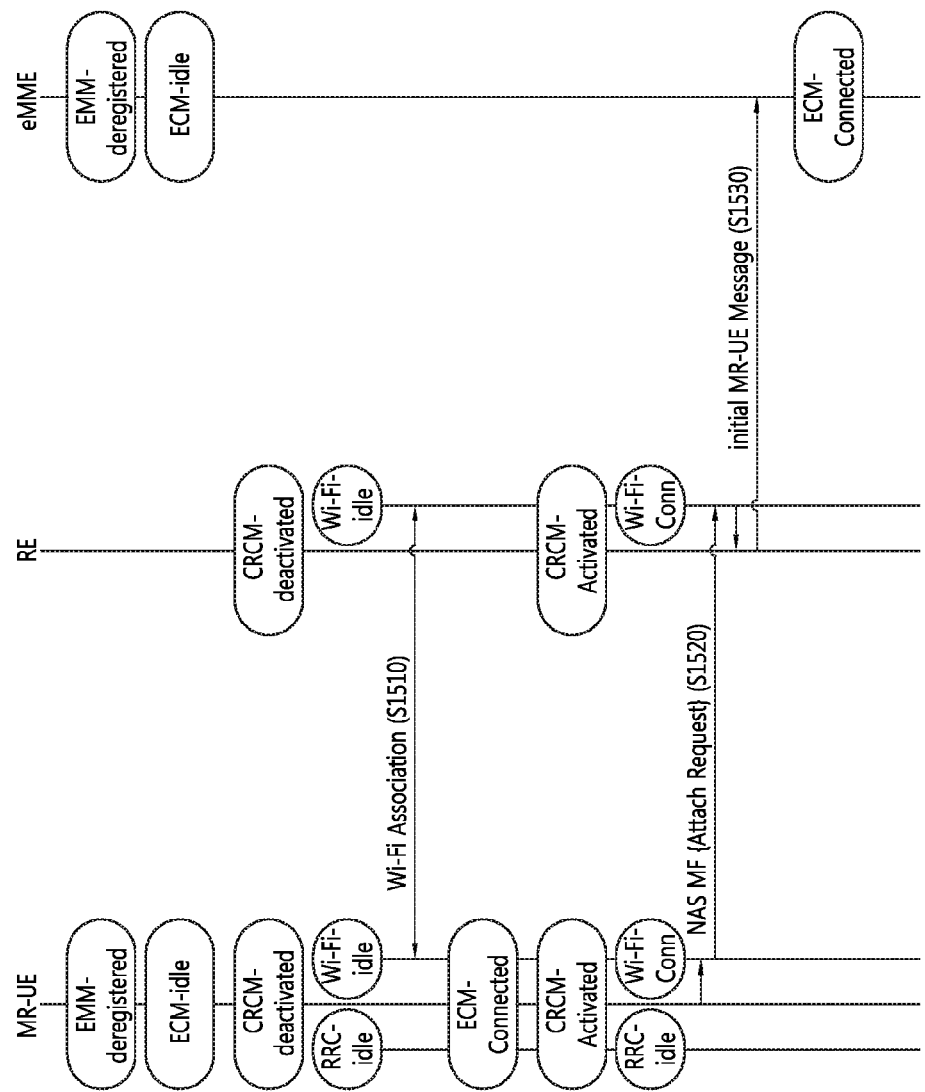
FIG. 15 is a control flowchart for describing a connection between a UE and a core network according to an embodiment of the present invention.

FIG. 15 is a control flowchart for describing a connection between a UE and a core network according to an embodiment of the present invention. Particularly, FIG. 15 is a diagram for describing a connection establishment process between a multi-RAT UE and an eMME via an eAP.

As shown in FIG. 15, since any connection relation is not established between the multi-RAT UE (MR-UE in the drawing) and the eMME initially, the EMM of the multi-RAT UE and the eMME is in the deregistered state, and the ECM is also in the idle state. In addition, since a Wi-Fi module is in the idle state before a link is generated between the multi-RAT UE and the eAP through a radio interface, the CRCM is also in the deactivated state.

If a Wi-Fi association for forming a Wi-Fi link between the multi-RAT UE and the eAP occurs (step, S1510), the ECM of the multi-RAT UE is in the connection state and the CRCM which is linked to the ECM is also switched to the activated state.

The multi-RAT UE may know through scanning which type the RE is, authentication or association, and through this, determine whether to perform a connection process using a NAS protocol such as attachment.

During the Wi-Fi association process, the multi-RAT UE may deliver an association cause to the eAP. For example, the association cause may be emergency, high priority access, MT-access, MO-signaling, MO-data, delay tolerant access, and so on.

Furthermore, during the Wi-Fi association process, the multi-RAT UE may deliver an authentication scheme to be used to the eAP, and such an authentication scheme may be the existing authentication scheme which is used for the Wi-Fi interface.

As such, when a radio link is formed between the multi-RAT UE and the RE, the multi-RAT UE may transmit a NAS message (NAS MF {Attach Request}) for a connection with the eMME through the eAP (step, S1520).

The eAP that receives the NAS message transmits an initial MR-UE message to the eMME (step, S1530).

The initial MR-UE message may include an eAP MR-UE S1AP ID, a NAS-PDU: Attach Request, a TAI, an association cause and an evolved cell global ID (ECGI). The ECGI represents identifier information that enables the eMME to know through which wireless node (RE or WLAN AP) is setup for a specific session for the MR-UE practically.

In this case, the Wi-Fi index for representing that the current multi-RAT UE and the eAP are connected through the Wi-Fi interface may be determined during an S21-eMME setup process, and this may be signaled as one of cell IDs.

Table 5 below represents cell IDs and description for the cell IDs according to the embodiment.

TABLE 5

| Cell ID | Descriptions |
|---------|--------------|
| 000001  | Wi-Fi #1     |
| ...     | ...          |

According to Table 5, "000001" of cell IDs represents that the multi-RAT UE is connected wirelessly through the Wi-Fi interface via the eAP.

The eMME that receives the cell ID may detect that the UE requesting a connection through the NAS protocol is a UE accessed through Wi-Fi via the eAP, and may implicitly know that the UE may perform an authentication process with the existing authentication scheme which is used in Wi-Fi.

The cell ID may be signaled as Table 5 for authentication, and in this case, the RE IE may be setup as a pre-configured value (e.g., 00000). Or, the ECGI may be defined as a format that has a shape except the RE field.

Since a session establishment process between the multi-RAT UE and the eMME in the structure shown in FIG. 14 is similar to that of FIG. 13, the repeated description will be omitted. That is, according to the embodiment, the function performed by the RE in FIG. 13 may also be performed by the eAP.

Figure 16:
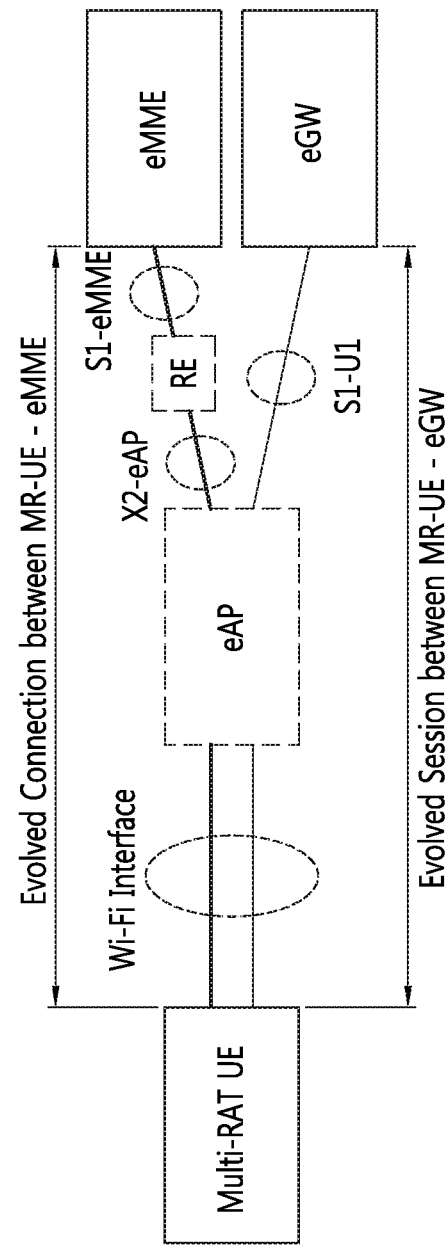
FIG. 16 is a diagram for describing an interface of an eAP and a core network according to another embodiment of the present invention.

FIG. 16 is a diagram for describing an interface of an eAP and a core network according to another embodiment of the present invention.

As shown in FIG. 16, a multi-RAT UE may be connected to an eMME or an eGW through an enhanced AP (eAP). Between the eAP and the eMME, a RE may be included for an interaction of the eAP and the eMME.

Similar to FIG. 14, a radio interface through a Wi-Fi link may be formed between the multi-RAT UE and the eAP, and an S21-U interface may be formed between the eAP and the eGW.

The eAP may be connected to a RE through an X2-eAP interface, and the RE may be connected to the eMME through an S1-eMME interface.

Between the multi-RAT UE and the eMME, a NAS message for a connection (Evolved Connection or connection establishment) may be transmitted or received through the eAP between the multi-RAT UE and the eMME, and between the multi-RAT UE and the eGW, a NAS message for a session (Evolved Session or session establishment) may be transmitted or received. Or, the NAS message for the session may be transmitted or received between the multi-RAT UE and the eMME.

The eAP of FIG. 16 may include the WLAN AP of FIG. 4, and the eAP according to the embodiment may perform an interface connection by a core network and a NAS protocol through a communication with the eMME of the core network.

Figure 17:
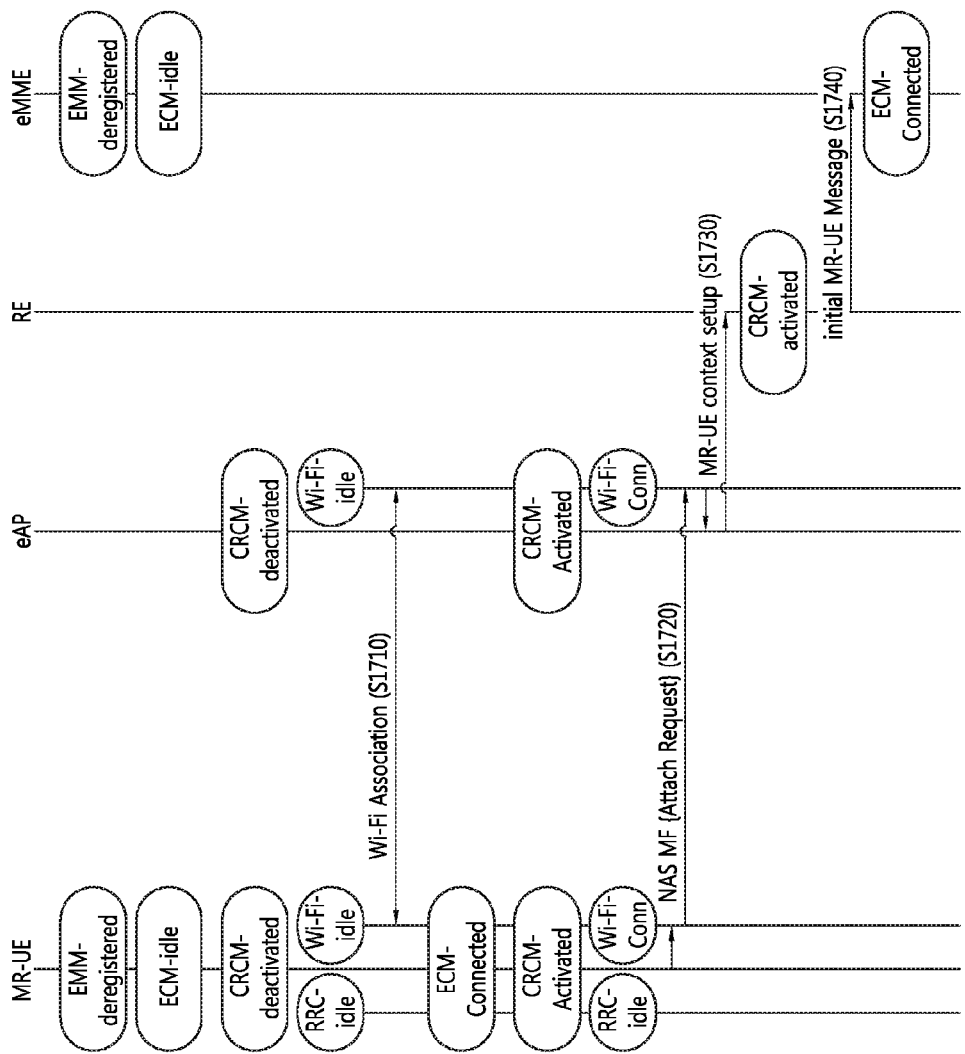
FIG. 17 is a control flowchart for describing a connection between a UE and a core network according to another embodiment of the present invention.

FIG. 17 is a control flowchart for describing a connection between a UE and a core network according to another embodiment of the present invention. Particularly, FIG. 17 is a diagram for describing a connection establishment process between a multi-RAT UE and an eMME in case that the multi-RAT UE and the eAP communicate through a Wi-Fi link.

As shown in FIG. 17, according to the embodiment, a RE is existed between the eAP and the eMME, and the RE forms an interface with the eMME for delivering a NAS message.

Since any connection relation is not established between the multi-RAT UE (MR-UE in the drawing) and the eMME initially, the EMM of the multi-RAT UE and the eMME is in the deregistered state, and the ECM is also in the idle state.

In addition, since both a RRC module of the multi-RAT UE and a Wi-Fi module are in the idle state before a link is generated between the multi-RAT UE and the eAP through a radio interface, the CRCM of the multi-RAT UE is also in the deactivated state. And the CRCM of the eAP and the RE is also in the deactivated state.

If a Wi-Fi association for forming a Wi-Fi link between the multi-RAT UE and the eAP occurs (step, S1710), the ECM of the multi-RAT UE is in the connection state and the CRCM which is linked to the ECM is also switched to the activated state.

The multi-RAT UE may know through scanning which type the eAP is, authentication or association, and through this, determine whether to perform a connection process using a NAS protocol such as attachment.

During the Wi-Fi association process, the multi-RAT UE may deliver an association cause to the eAP. Furthermore, during the Wi-Fi association process, the multi-RAT UE may deliver an authentication scheme to be used to the eAP, and such an authentication scheme may be the existing authentication scheme which is used for the Wi-Fi interface.

As such, when a radio link is formed between the multi-RAT UE and the eAP, the multi-RAT UE may transmit a NAS message (NAS MF {Attach Request}) for a connection with the eMME (step, S1720).

The eAP that receives the NAS message transmits a MR-UE context setup message including the association cause and NAS-PDU: Attach Request to the RE (step, S1730). Owing to this, the CRCM of the RE is switched from the deactivated state to the activated state.

In performing step S1730, the eAP may determine through which RE is appropriate to setup a NAS connection depending on the MR-UE context belonged to itself.

For example, in case that the MR-UE does not access to any RE, the eAP may decide a RE by limiting to the RE where itself and an X2-eAP interface exist.

Or, in addition to the limited RE, the eAP may decide a RE by limiting to the RE which is mostly like to be accessed by the MR-UE based on a measurement result for the RE which is performed by the MR-UE. In this case, the MR-UE may report a measurement result such as PLMN, signal strength and load to the eAP.

Or, the eAP may transmit a context setup message by selecting the RE where the MR-UE is accessed presently. In this case, access information may be received from the MR-UE, and the eAP may already know the information on the RE in case that the RE commands a radio link to the MR-UE through the eAP.

The RE that receives the context setup message transmits an initial MR-UE message that includes a RE MR-UE S1AP ID, NAS-PDU: Attach Request, TAI, ECGI and an association cause to the eMME (step, S1740).

The initial MR-UE message transmitted to the eMME by being triggered by the eAP includes an association cause and an evolved cell global ID (ECGI). The ECGI represents identifier information that enables the eMME to know through which wireless node (RE or WLAN AP) is setup for a specific session for the MR-UE practically.

In this case, the Wi-Fi index for representing that the current multi-RAT UE and the RE are connected through the Wi-Fi interface may be determined during an S1-eMME setup process, and this may be signaled as one of cell IDs.

Table 6 below represents cell IDs and description for the cell IDs.

TABLE 6

| Cell ID | Descriptions |
| --- | --- |
| 000001 | Cellular #1 |
| ... | ... |
| 100001 | Collocated Wi-Fi #1 |
| ... | ... |
| 100111 | Connected Wi-Fi #1 |

According to Table 6, "000001" of cell IDs represents that the multi-RAT UE is connected wirelessly through the cellular interface, and "100001" is a Wi-Fi index that represents that the multi-RAT UE is connected wirelessly through the WLAN AP included in the RE that supports both a cellular BS and the WLAN AP. Cell ID "100111" is a Wi-Fi index that represents that the multi-RAT UE is connected wirelessly through the WLAN AP where an interface is existed with the RE that supports a cellular BS.

The eMME that receives the cell ID may detect that the UE requesting a connection through the NAS protocol is a UE accessed through Wi-Fi, and may implicitly know that the UE may perform an authentication process with the existing authentication scheme which is used in Wi-Fi. For such an authentication, the authentication scheme shown in Table 3 may be applied.

Figure 18:
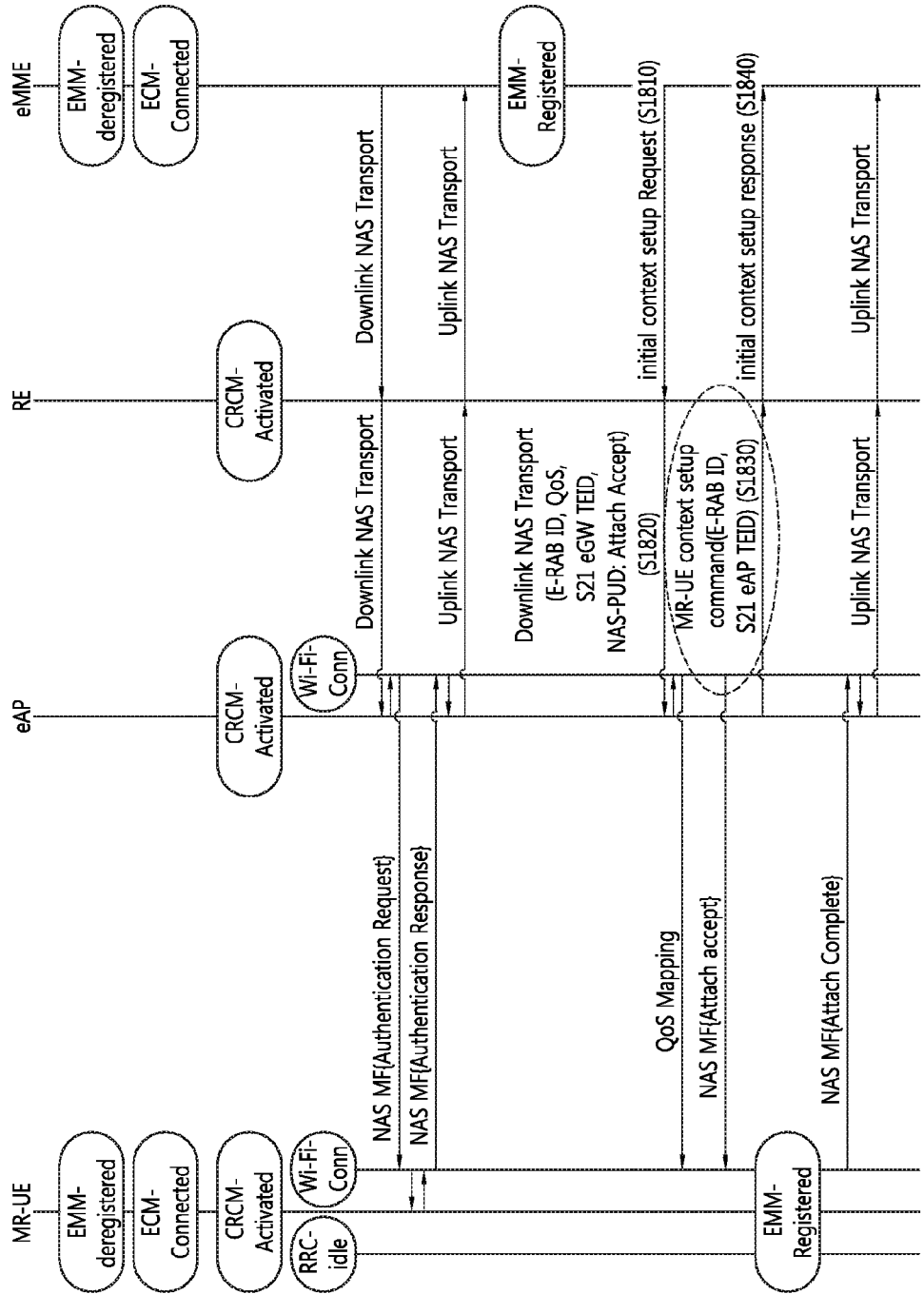
FIG. 18 is a control flowchart for describing a session establishment between a UE and a core network according to another embodiment of the present invention.
Figure 19:
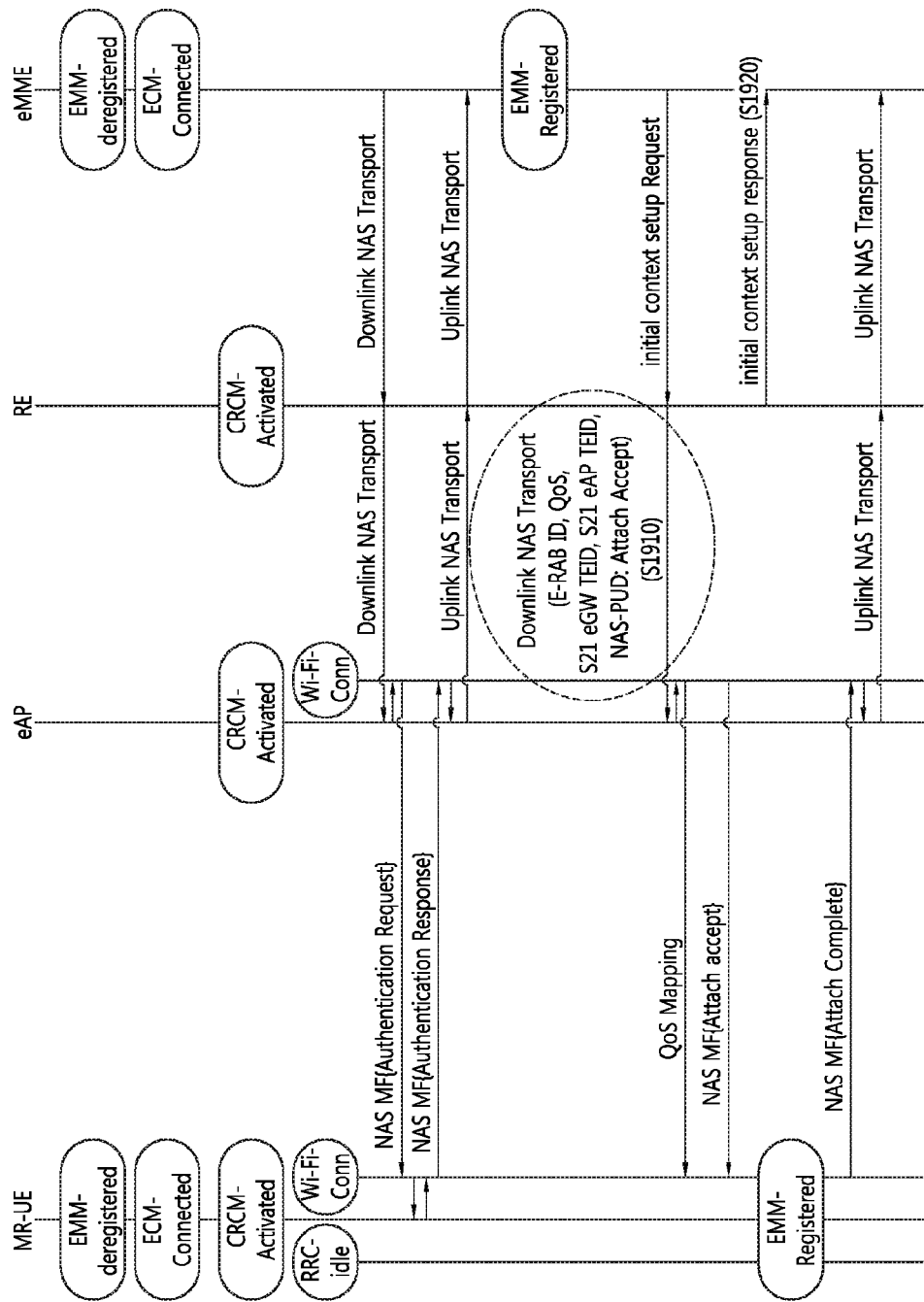
FIG. 19 is a control flowchart for describing a session establishment between a UE and a core network according to another embodiment of the present invention.

FIG. 18 and FIG. 19 are control flowcharts for describing a session establishment between a UE and a core network according to another embodiment of the present invention.

Similar to FIG. 16, FIG. 18 shows the case that an interface of RE is existed between an eAP and an eMME. Particularly, FIG. 18 shows that a subject of allocating an S21 eAP TEID is the eAP, and FIG. 19 shows a subject of allocating an S21 eAP TEID is the RE.

A tunnel endpoint identifier (TEID) is a tunnel endpoint identifier, and two TEIDs for uplink and downlink may be included in one bearer.

As shown in FIG. 18, since the process of transmitting a downlink NAS message to a MR-UE through a RE and an eAP from an eMME, requesting authentication, exchanging authentication response, and transmitting an uplink NAS message to the eMME are similar to those of FIG. 13, the repeated description will be omitted.

When the EMM of the eMME is switched to the registered state, the eMME delivers an initial context setup request message to the RE (step, S1810).

According to this, a downlink NAS transport message is transmitted to the eAP via the RE (step, S1820). Although the downlink NAS transport message includes an E-RAB ID, QoA, an S21 Egw TEID, a NAS-PUD: Attach Accept, an eGW TEID which is a TEID for uplink is included in the downlink NAS transport message delivered to the eAP from the RE, but a TEID for downlink is not included since the subject for allocating an S21 eAP TEID is the eAP.

When receiving attachment acceptance message from the MR-UE, the eAP transmits a MR-UE context setup command that includes the S21 eAP TEID (step, S1830).

The RE that receives information on the S21 eAP TEID, at last, may transmit an initial context setup response to the eMME (step, S1840).

FIG. 19 shows a case that a subject for allocating an S21 eAP TEID is the RE. In the drawing, a case of perceiving a TEID which is already occupied by a scheme in which delay is considered is described. The repeated description with FIG. 18 will be omitted.

When an initial context setup request message is delivered to a RE by an eMME, the RE transmits a downlink NAS transport message to an eAP (step, S1910). Since the RE may allocate a TEID for downlink, an S21 eAP TEID may be included in the downlink NAS transport message.

In addition, the RE may transmit an initial context setup response to the eMME (step, S1920) in parallel with transmitting the downlink NAS transport message to the eAP.

Figure 20:
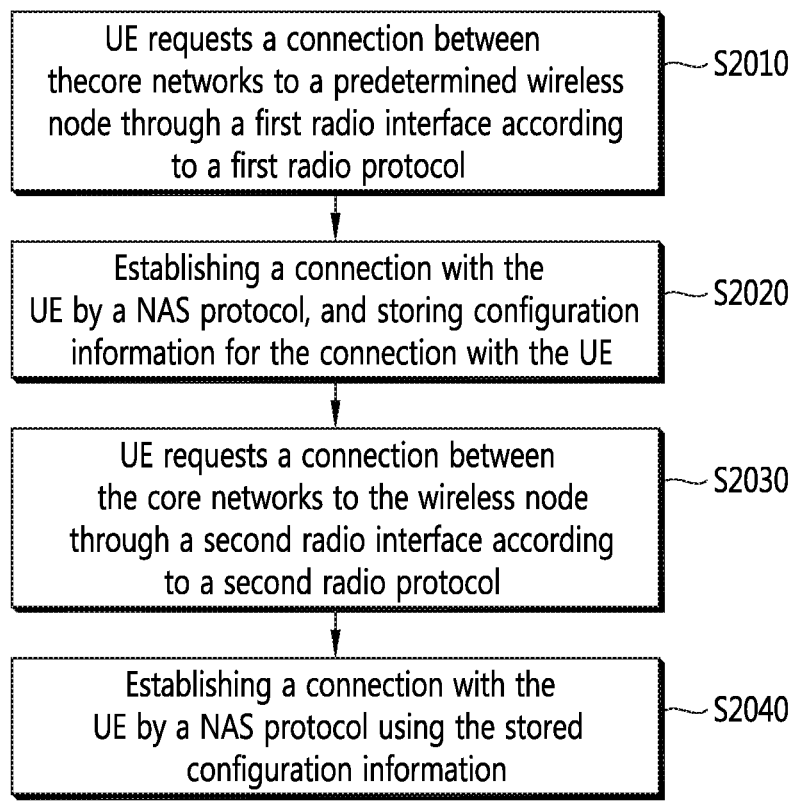
FIG. 20 is a control flowchart for describing a method for connecting a network controller in a core network with a UE.

FIG. 20 is a control flowchart for describing a method for connecting a network controller in a core network with a UE.

First, when the UE requests a connection between the core networks to a predetermined wireless node through a first radio interface according to a first radio protocol (step, S2010), a network controller in the core network establishes a connection with the UE by a NAS protocol, and stores configuration information for the connection with the UE (step, S2020).

The UE according to the embodiment may be the multi-RAT UE described above, and the network controller may be the eMME within the core network. Furthermore, a wireless node may include the RE that performs a role of a BS.

As described above, in case of being connected to the UE through a radio interface, the RE may deliver a NAS message between the UE and the core network through an interface with the eMME. Through such a process, the UE and the core network establish a connection with each other. In the embodiment, establishing the connection with the UE using the NAS protocol may mean configuring the mobility management state (EMM) to be registered state.

Then, when the UE requests a connection between the core networks to the wireless node through a second radio interface according to a second radio protocol (step, S2030), the network controller establishes a connection with the UE by a NAS protocol using the stored configuration information (step, S2040). That is, the network controller may establish a connection with the UE without performing an additional attachment process.

Here, the first radio interface and the second radio interface may be a wireless connection based on cellular or Wi-Fi.

In case that both the connection between the UE and the wireless node through the first radio interface and the connection between the UE and the wireless node through the second radio interface are released, the connection between the core network and the UE may be released. However, in case that the connection between the UE and the wireless node based on any one of the first radio interface and the second radio interface is changed to one another, the connection between the core network and the UE may be maintained.

That is, if the UE and the wireless node is connected through any one of the first radio interface and the second interface, the connection between the core network and the UE may be maintained.

When establishing the connection with the UE by the NAS protocol, a node identifier that is available to distinguish a radio protocol to which the UE and the wireless node is connected and a type of the wireless node may be signaled to the network controller through the wireless node.

Figure 21:
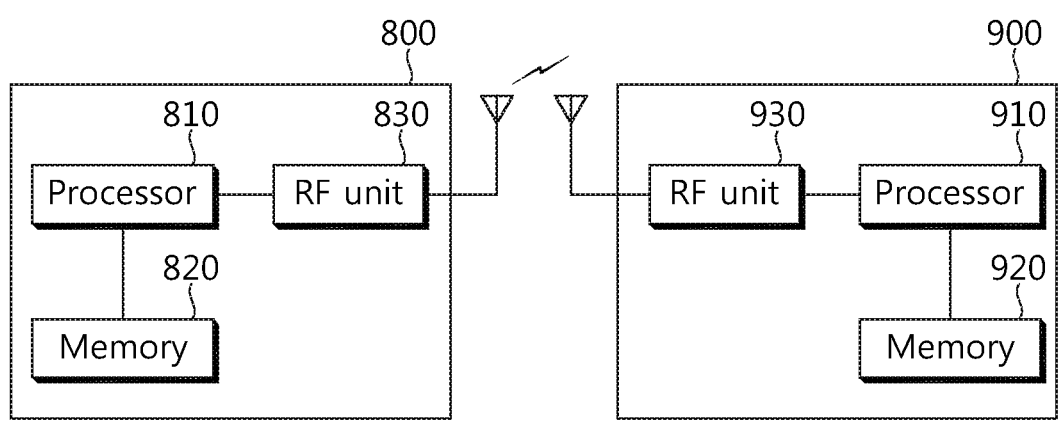
FIG. 21 is a block diagram illustrating a wireless communication system according to an embodiment of the present invention.

FIG. 21 is a block diagram illustrating a wireless communication system according to an embodiment of the present invention.

ABS 800 includes a processor 810, a memory 820, and an RF (radio frequency) unit 830. The processor 810 implements the proposed functions, procedure, and/or methods. The layers of radio interface protocol may be implemented by the processor 810. The memory 820 which is coupled to the processor 810 stores a variety of information for driving the processor 810. The RF unit 830 which is coupled to the processor 810 transmits and/or receives a radio signal. The BS 800 of FIG. 21 may include the cellular BS, the WLAN AP or the RE described above.

A UE 900 includes a processor 910, a memory 920, and an RF (radio frequency) unit 930. The processor 910 implements the proposed functions, procedure, and/or methods. The layers of radio interface protocol may be implemented by the processor 910. The memory 920 which is coupled to the processor 910 stores a variety of information for driving the processor 910. The RF unit 930 which is coupled to the processor 910 transmits and/or receives a radio signal. The UE 900 of FIG. 21 may include the multi-RAT UE described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for processing control information by a base station (BS) in a communication system comprising a mobility management entity (MME), the BS comprising a module controlling a first radio access technology (RAT) associated with a cellular access interface and a second RAT associated with a wireless local area network (WLAN) interface, the method comprising:
   receiving, by the BS, an association request from a user equipment (UE) supporting multiple RATs;
   in response to the association request, changing, by the BS, a state of the module into an activated state and a state of the second RAT into a connected state;
   establishing, by the BS, a WLAN connection with the UE;
   receiving, by the BS, a Non-Access Stratum (NAS) protocol message on the established WLAN connection to allow the UE to be directly attached to the MME via the WLAN interface; and
   in response to the NAS protocol message, transmitting, by the BS, an initial UE message including a first identifier (ID) indicating the BS and a second ID indicating the second RAT to the MME enabling the MME to transition from an idle state to a connected state.

2. The method of claim 1, wherein the UE is detached to the MME, if the state of the module is changed into a deactivated.

3. The method of claim 1, wherein the UE is attached to the MME, if a connection between the UE and the BS based on any one of the cellular access interface and the WLAN interface is changed to another.

4. The method of claim 1, wherein the UE is attached to the MME, if the UE and the BS are connected through any one of the cellular access interface and the WLAN interface.

5. The method of claim 1, wherein establishing the WLAN connection with the UE includes receiving a node identifier indicating an authentication scheme for the WLAN connection.

6. A base station configured to process control information in a communication system comprising a mobility management entity (MME), the base station comprising:
   a signal transmitting and receiving unit; and
   a processor connected to the signal transmitting and receiving unit,
   wherein the processor includes a module controlling a first radio access technology (RAT) associated with a cellular access interface and a second RAT associated with a wireless local area network (WLAN) interface, and
   wherein the processor is configured to:
   receive an association request from a user equipment (UE) supporting multiple RATs;
   in response to the association request, changing, by the BS, a state of the module into an activated state and a state of the second RAT into a connected state;
   establish, by the BS, a WLAN connection with the UE;
   receive a Non-Access Stratum (NAS) protocol message on the established WLAN connection to allow the UE to be directly attached to the MME via the WLAN interface; and
   in response to the NAS protocol message, transmit an initial UE message including a first identifier (ID) indicating the BS and a second ID indicating the second RAT to the MME enabling the MME to transition from an idle state to a connected state.

7. The base station of claim 6, wherein the UE is detached to the MME, if the state of the module is changed into a deactivated.

8. The base station of claim 6, wherein the UE is attached to the MME, if a connection between the UE and the BS based on any one of the cellular access interface and the WLAN interface is changed to another.

9. The base station of claim 6, wherein the UE is attached to the MME, if the UE and the BS are connected through any one of the cellular access interface and the WLAN interface.

* * * * *